US009292109B2

(12) United States Patent
Thompson et al.

(10) Patent No.: US 9,292,109 B2
(45) Date of Patent: Mar. 22, 2016

(54) INTERACTIVE INPUT SYSTEM AND PEN TOOL THEREFOR

(71) Applicant: SMART Technologies ULC, Calgary (CA)

(72) Inventors: Sean Thompson, Calgary (CA); Grant McGibney, Calgary (CA); Gerald D. Morrison, Calgary (CA)

(73) Assignee: SMART Technologies ULC, Calgary (CA)

( * ) Notice: Subject to any disclaimer, the term of this patent is extended or adjusted under 35 U.S.C. 154(b) by 50 days.

(21) Appl. No.: 13/625,668

(22) Filed: Sep. 24, 2012

(65) Prior Publication Data

US 2013/0100022 A1    Apr. 25, 2013

Related U.S. Application Data

(60) Provisional application No. 61/537,754, filed on Sep. 22, 2011.

(51) Int. Cl.
*G06F 3/033* (2013.01)
*G06F 3/041* (2006.01)
*G06F 3/0354* (2013.01)
*G06F 3/042* (2006.01)

(52) U.S. Cl.
CPC ............ *G06F 3/03545* (2013.01); *G06F 3/033* (2013.01); *G06F 3/03543* (2013.01); *G06F 3/0421* (2013.01)

(58) Field of Classification Search
CPC .............. G06F 3/0421–3/0428; G06F 3/03545
USPC ................... 345/156, 157, 175, 179
See application file for complete search history.

(56) References Cited

U.S. PATENT DOCUMENTS

| 5,448,263 | A | 9/1995 | Martin |
| 5,793,360 | A * | 8/1998 | Fleck et al. ............. 345/179 |
| 6,141,000 | A | 10/2000 | Martin |
| 6,337,681 | B1 | 1/2002 | Martin |
| 6,411,362 | B2 | 6/2002 | Anderson et al. |
| 6,567,078 | B2 | 5/2003 | Ogawa |
| 6,714,311 | B2 * | 3/2004 | Hashimoto ............. 356/623 |
| 6,747,636 | B2 | 6/2004 | Martin |
| 6,803,906 | B1 | 10/2004 | Morrison et al. |

(Continued)

FOREIGN PATENT DOCUMENTS

| EP | 1 447 706 B1 | 3/2009 | |
| WO | WO 01/63549 | * 8/2001 | ............ G06K 11/18 |

(Continued)

OTHER PUBLICATIONS

Transmittal; International Search Report; and Written Opinion of the International Searching Authority for International Application No. PCT/CA2012/000882.

(Continued)

*Primary Examiner* — Quan-Zhen Wang
*Assistant Examiner* — Xuemei Zheng
(74) *Attorney, Agent, or Firm* — Katten Muchin Rosenman LLP

(57) ABSTRACT

A pen tool for use with a machine vision interactive input system comprises an elongate body, a tip on the body and a variable reflector disposed on the body. The variable reflector comprises a reflecting portion and an attenuating portion configured to control the amount of illumination reflected by the reflecting portion.

32 Claims, 33 Drawing Sheets

(56) References Cited

U.S. PATENT DOCUMENTS

| | | | |
|---|---|---|---|
| 6,823,481 B2 | 11/2004 | Takekawa | |
| 6,972,401 B2 | 12/2005 | Akitt et al. | |
| 7,202,860 B2 | 4/2007 | Ogawa | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,414,617 B2 | 8/2008 | Ogawa | |
| 7,619,600 B2 | 11/2009 | Harada et al. | |
| 2003/0066691 A1* | 4/2003 | Jelinek et al. | 178/18.01 |
| 2004/0140963 A1* | 7/2004 | Kim et al. | 345/179 |
| 2004/0179001 A1 | 9/2004 | Morrison et al. | |
| 2007/0165007 A1* | 7/2007 | Morrison et al. | 345/175 |
| 2007/0177880 A1* | 8/2007 | Karasikov et al. | 398/170 |
| 2009/0277697 A1* | 11/2009 | Bolt et al. | 178/19.01 |
| 2009/0278794 A1* | 11/2009 | McReynolds et al. | 345/156 |
| 2009/0284670 A1 | 11/2009 | Xue | |
| 2011/0080553 A1 | 4/2011 | Sun | |
| 2011/0170253 A1 | 7/2011 | Liu et al. | |
| 2011/0199533 A1* | 8/2011 | Drader et al. | 348/345 |
| 2011/0221706 A1 | 9/2011 | McGibney et al. | |
| 2011/0242006 A1 | 10/2011 | Thompson et al. | |
| 2011/0242060 A1 | 10/2011 | McGibney et al. | |

FOREIGN PATENT DOCUMENTS

| | | |
|---|---|---|
| WO | 2009/135321 A1 | 11/2009 |
| WO | 2011/047459 A1 | 4/2011 |

OTHER PUBLICATIONS

M. Oltean, "Switchable Glass: A possible mediun for Evolvable Hardware", Proceedings of the First NASA/ESA Conference on Adaptive Hardware and Systems, AHS 2006 IEEE, Jun. 15-18, 2006, pp. 81-87.

\* cited by examiner

INTERACTIVE INPUT SYSTEM AND PEN TOOL THEREFOR

CROSS-REFERENCE TO RELATED APPLICATION

This application claims the benefit of U.S. Provisional Application No. 61/537,754 to Thompson et al. filed on Sep. 22, 2011, entitled "Interactive Input System and Pen Tool Therefor" the entire disclosure of which is incorporated herein by reference.

FIELD OF THE INVENTION

The present invention relates to an interactive input system and to a pen tool therefor.

BACKGROUND OF THE INVENTION

Interactive input systems that allow users to inject input into an application program using an active pointer (e.g. a pointer that emits light, sound or other signal), a passive pointer (e.g. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the entire disclosures of which are incorporated by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Pat. No. 6,972,401 to Akitt et al. assigned to SMART Technologies ULC, the disclosure of which is incorporated herein by reference in its entirety, discloses an illuminated bezel for use in a touch system such as that disclosed in above-incorporated U.S. Pat. No. 6,803,906 to Morrison et al. The illuminated bezel comprises infrared (IR) light emitting diodes (LEDs) that project infrared light onto diffusers. The diffusers in turn, diffuse the infrared light so that the intensity of backlighting provided over the touch surface by the illuminated bezel is generally even across the surfaces of the diffusers. As a result, the backlight illumination provided by the bezel appears generally continuous to the digital cameras. Although this illuminated bezel works very well, it adds cost to the touch system.

U.S. Patent Publication Application No. 2011/0242060 to McGibney et al., entitled "INTERACTIVE INPUT SYSTEM AND INFORMATION INPUT METHOD THEREFOR", filed Apr. 1, 2010, assigned to SMART Technologies ULC, the disclosure of which is incorporated herein by reference in its entirety, discloses an interactive input system comprising at least one imaging assembly having a field of view looking into a region of interest and capturing image frames and processing structure in communication with the at least one imaging assembly. When a pointer exists in captured image frames, the processing structure demodulates the captured image frames to determine frequency components thereof and examines the frequency components to determine at least one attribute of the pointer.

U.S. Patent Application Publication No. 2011/0242006 to Thompson et al., filed on Apr. 1, 2010, entitled "INTERACTIVE INPUT SYSTEM AND PEN TOOL THEREFOR", and assigned to SMART Technologies ULC, the disclosure of which is incorporated herein by reference in its entirety, discloses a pen tool for use with a machine vision interactive input system comprising an elongate body and a tip arrangement at one end of the body. An end surface of the body at least partially about the tip arrangement carries light reflective material that is visible to at least one imaging assembly of the interactive input system when the pen tool is angled.

U.S. Pat. No. 6,823,481 to Takekawa discloses a method and apparatus for preventing misdetection of coordinates of a pointing instrument. A coordinate input/detection device compares a waveform of a signal corresponding to intensity distribution of rays received from a coordinate input area by a light-receiving unit and a standard waveform at fixed timing. If the waveform is not equal to the standard waveform, the coordinate input/detection device determines that an installation position of the light-receiving unit is off a correct position because of shock or vibration. A new standard waveform is obtained and stored in a storage unit, thereby setting the waveform of the signal corresponding to the intensity distribution of rays received by the light-receiving unit located at an incorrect position as the standard waveform.

U.S. Pat. Nos. 7,202,860 and 7,414,617 to Ogawa disclose a coordinate input device that includes a pair of cameras positioned in an upper left position and an upper right position of a display screen of a monitor lying close to a plane extending from the display screen of the monitor and views both a side face of an object in contact with a position on the display screen and a predetermined desktop coordinate detection area to capture the image of the object within the field of view. The coordinate input device also includes a control circuit which calculates the coordinate value of a pointing tool, pointing to a position within a coordinate detection field, based on video signals output from the pair of cameras, and transfers the coordinate value to a program of a computer.

U.S. Pat. No. 6,567,078 to Ogawa discloses a handwriting communication system, a handwriting input device and a handwriting display device used in the system, which can communicate by handwriting among a plurality of computers connected via a network. The communication system includes a handwriting input device which is provided at a transmitting side for inputting the handwriting into a transmitting side computer, and a handwriting display device which is provided at a receiving side for displaying the handwriting based on information transmitted from the transmitting side to a receiving side computer. The system transmits only a contiguous image around the handwritten portion, which reduces the communication volume compared to transmitting the whole image, and which makes the real time transmission and reception of handwriting trace possible.

U.S. Pat. No. 6,441,362 to Ogawa discloses an optical digitizer for determining a position of a pointing object projecting a light and being disposed on a coordinate plane. In the optical digitizer, a detector is disposed on a periphery of the coordinate plane and has a view field covering the coordinate plane for receiving the light projected from the pointing object and for converting the received light into an electric signal. A processor is provided for processing the electric signal fed from the detector to compute coordinates representing the position of the pointing object. A collimator is disposed to limit the view field of the detector below a predetermined height relative to the coordinate plane such that through the limited view field the detector can receive only a parallel component of the light which is projected from the pointing object substantially in parallel to the coordinate plane. A shield is disposed to enclose the periphery of the coordinate plane to block noise light other than the projected light from entering into the limited view field of the detector.

Improvements are generally desired. It is therefore an object of the present invention at least to provide a novel interactive input system and a pen tool therefor.

SUMMARY OF THE INVENTION

Accordingly, in one aspect there is provided a pen tool for use with a machine vision interactive input system comprising an elongate body; a tip on the body; and a variable reflector disposed on the body, the variable reflector comprising a reflecting portion and an attenuating portion configured to control the amount of illumination reflected by the reflecting portion.

In one embodiment, the variable reflector is positioned adjacent the tip. The attenuating portion comprises a liquid crystal device. In one form, the liquid crystal device is a polymer dispersed liquid crystal device comprising a polymer dispersed liquid crystal film positioned in an annular region between coaxial electrodes. The transparency of the attenuating element is proportional to an applied voltage and the variable reflector further may comprise a protective outer portion.

In one embodiment, the pen tool further comprises a microcontroller configured to switch the attenuating portion between differing levels of transparency. In one embodiment, the pen tool further comprises an actuator protruding from the tip and being in communication with the controller. The controller is configured to switch the attenuating portion between two or more levels of transparency in response to actuation of the actuator. In another embodiment, the pen tool further comprises a switch arrangement in communication with the controller for selecting the differing levels of transparency.

In another embodiment, the reflecting portion comprises a retro-reflective material. In a further embodiment, the attenuating portion covers only a portion of the retro-reflective material.

In another aspect, there is provided an interactive input system comprising at least one imaging assembly having a field of view looking into a region of interest and capturing image frames; at least one illumination source configured to emit illumination into said region of interest; and processing structure in communication with the at least one imaging assembly, when a pointer exists in captured image frames, said processing structure demodulating the captured image frames to determine frequency components thereof and examining the frequency components to determine at least one attribute of said pointer, the frequency components being representative of illumination reflected by said pointer.

In one embodiment, during demodulating the processing structure applies a transform to the captured image frames. In another embodiment, the illumination is infrared illumination.

In another embodiment, the attribute comprises one of pointer input colour, pointer input line thickness and pointer functionality. The pointer functionality may be one of right mouse click, left mouse click, and eraser.

In another embodiment, the at least one imaging assembly captures a sequence of image frames, each sequence comprising one image frame captured when the at least one illumination source is in an off state and a plurality of image frames captured when the at least one illumination source is in an on state. The processing structure may subtract the image frame captured when the at least one illumination source is in the off state from at least one image frame captured when at least one illumination source is in the on state to form a difference image frame, and determines a location of the pointer in the difference image frame. The processing structure further defines an analysis region associated with the pointer location, and applies the analysis region to the captured image frames for carrying out the examining.

In another aspect, there is provided a method of inputting information into an interactive input system comprising emitting illumination into a region of interest from at least one illumination source; capturing image frames of the region of interest; when a pointer exists in captured image frames, demodulating the captured image frames to determine frequency components thereof and examining the frequency components to determine at least one attribute of the pointer, the frequency components being representative of illumination reflected by said pointer.

BRIEF DESCRIPTION OF THE DRAWINGS

Embodiments will now be described more fully with reference to the accompanying drawings in which.

DETAILED DESCRIPTION OF THE EMBODIMENTS

Figure 1:
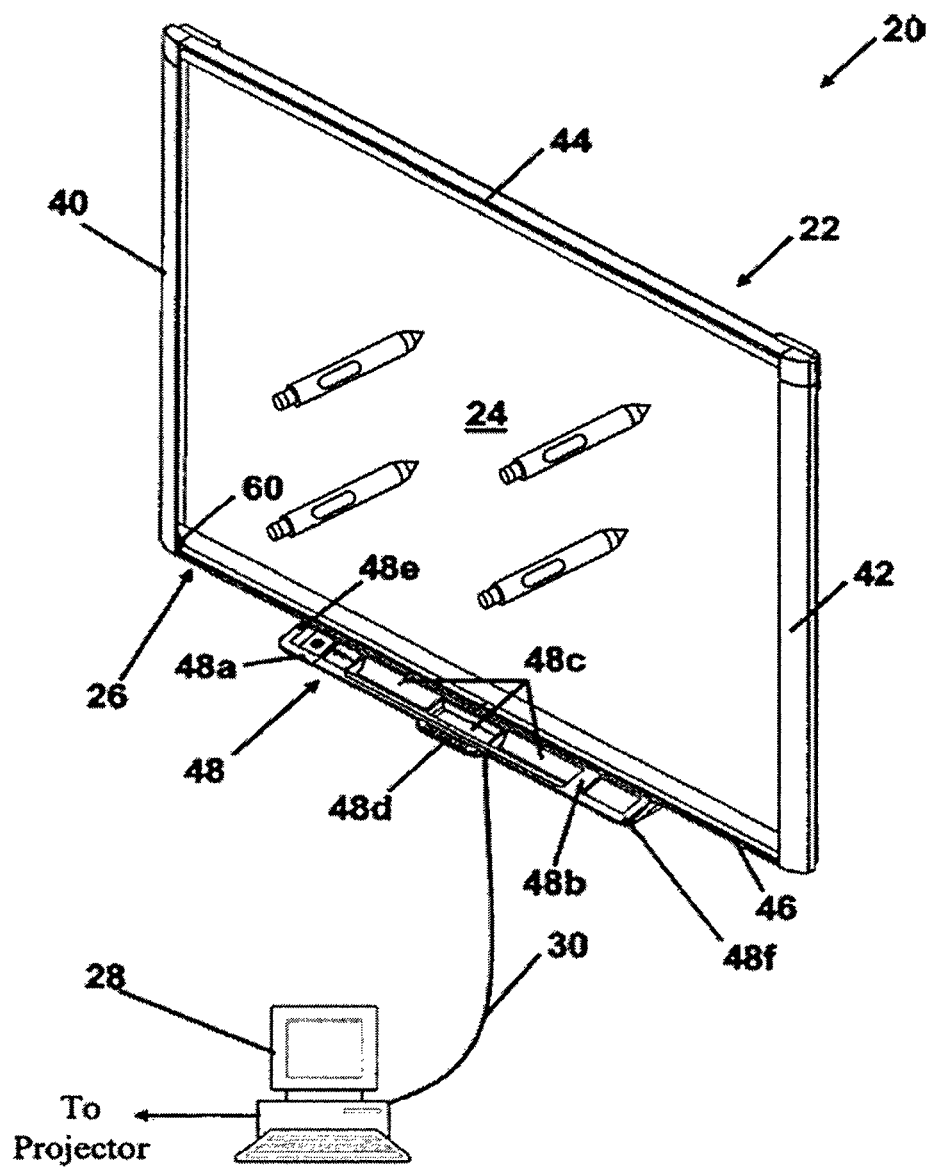
FIG. 1 is a schematic perspective view of an interactive input system.
Figure 2:
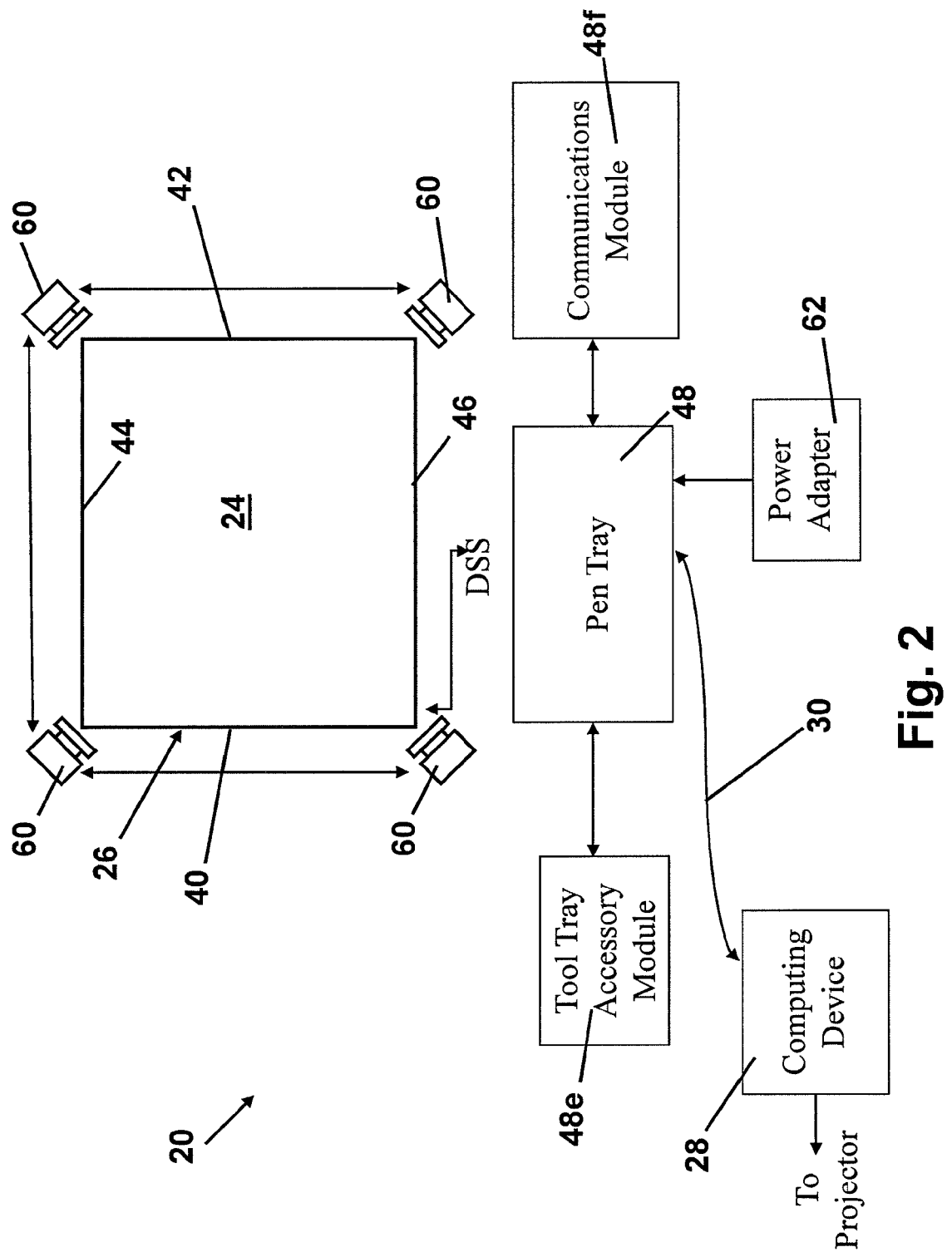
FIG. 2 is a schematic block diagram view of the interactive input system of FIG. 1.

Turning now to FIGS. 1 and 2, an interactive input system that allows a user to inject input such as digital ink, mouse events etc. into an executing application program is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. An ultra-short throw projector (not shown) such as that sold by SMART Technologies ULC under the name SMART UX60 is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless connection. General purpose computing device 28 processes the output of the interactive board 22 and, if required, adjusts image data being output to the projector so that the image presented on the interactive surface 24 reflects pointer activity. In this manner, the interactive board 22, general purpose computing device 28 and projector allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44, 46. Bezel segments 40 and 42 extend along opposite side edges of the interactive surface 24 while bezel segments 44 and 46 extend along the top and bottom edges of the interactive surface 24 respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 of the type described in International PCT Application Publication No. WO 2011/085486 is affixed to the interactive board 22 adjacent the bezel segment 46 using suitable fasteners such as for example, screws, clips, adhesive etc. As can be seen, the tool tray 48 comprises a housing 48a having an upper surface 48b configured to define a plurality of receptacles or slots 48c. The receptacles 48c are sized to receive one or more pen tools P as will be described as well as an eraser tool (not shown) that can be used to interact with the interactive surface 24. Control buttons 48d are provided on the upper surface 48b of the housing 48a to enable a user to control operation of the interactive input system 20. One end of the tool tray 48 is configured to receive a detachable tool tray accessory module 48e while the opposite end of the tool tray 48 is configured to receive a detachable communications module 48f for remote device communications. The housing 48a accommodates a master controller 50 (see FIG. 5) as will be described.

As shown in FIG. 2, imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as for example a user's finger, a cylinder or other suitable object, or a pen tool or eraser tool lifted from a receptacle 48c of the tool tray 48, that is brought into proximity of the interactive surface 24 appears in the fields of view of the imaging assemblies 60. A power adapter 62 provides the necessary operating power to the interactive board 22 when connected to a conventional AC mains power supply.

Figure 3:
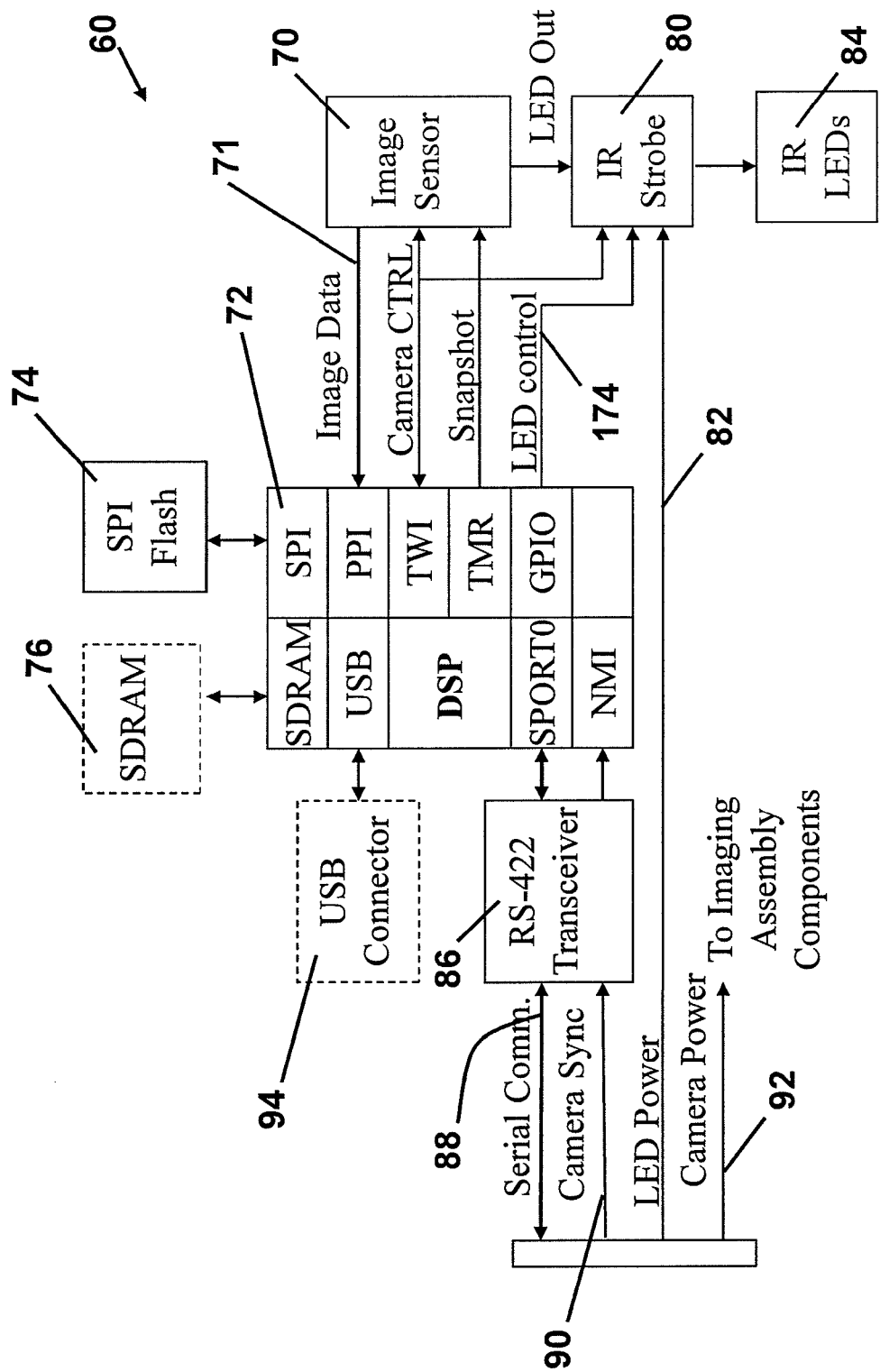
FIG. 3 is a block diagram of an imaging assembly forming part of the interactive input system of FIG. 1.

Turning now to FIG. 3, components of one of the imaging assemblies 60 are shown. As can be seen, the imaging assembly 60 comprises an image sensor 70 such as that manufactured by Aptina (Micron) under Model No. MT9V034 having a resolution of 752×480 pixels, fitted with a two element, plastic lens (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 71 via a parallel port interface (PPI). A serial peripheral interface (SPI) flash memory 74 is connected to the DSP 72 via an SPI port and stores the firmware required for image assembly operation. Depending on the size of captured image frames as well as the processing requirements of the DSP 72, the imaging assembly 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 71 via the PPI. The frame rate of the image sensor 70 in this embodiment is between about 900 and about 960 frames per second. The DSP 72 in turn processes image frames received from the image sensor 70 and provides pointer information to the master controller 50 at a reduced rate of approximately 120 points/sec. Those of skill in the art will however appreciate that other frame rates may be employed depending on the desired accuracy of pointer tracking and whether multi-touch and/or active pointer identification is employed.

Three strobe circuits 80 communicate with the DSP 72 via the TWI and via a general purpose input/output (GPIO) interface. The IR strobe circuits 80 also communicate with the image sensor 70 and receive power provided on LED power line 82 via the power adapter 62. Each strobe circuit 80 drives a respective illumination source in the form of an infrared (IR) light emitting diode (LED) 84 that provides infrared backlighting over the interactive surface 24. Further specifics concerning the strobe circuits 80 and their operation are described in U.S. Application Publication No. 2011/0169727 to Akitt entitled "Interactive Input System and Illumination System Therefor" filed on Feb. 19, 2010, the disclosure of which is incorporated herein by reference in its entirety.

The DSP 72 also communicates with an RS-422 transceiver 86 via a serial port (SPORT0) and a non-maskable interrupt (NMI) port. The transceiver 86 communicates with the master controller 50 over a differential synchronous signal (DSS) communications link 88 and a synch line 90. Power for the components of the imaging assembly 60 is provided on power line 92 by the power adapter 62. DSP 72 may also optionally be connected to a USB connector 94 via a USB port as indicated by the dotted lines. The USB connector 94 can be used to connect the imaging assembly 60 to diagnostic equipment.

Figure 4A:
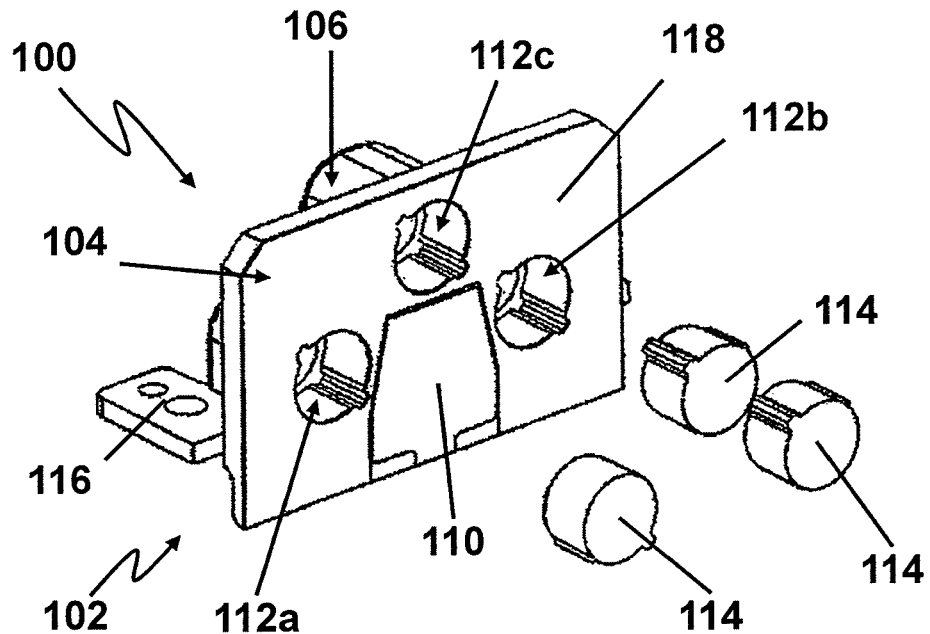
FIGS. 4A and 4B are front and rear perspective views, respectively, of a housing assembly forming part of the imaging assembly of FIG. 3.
Figure 4B:
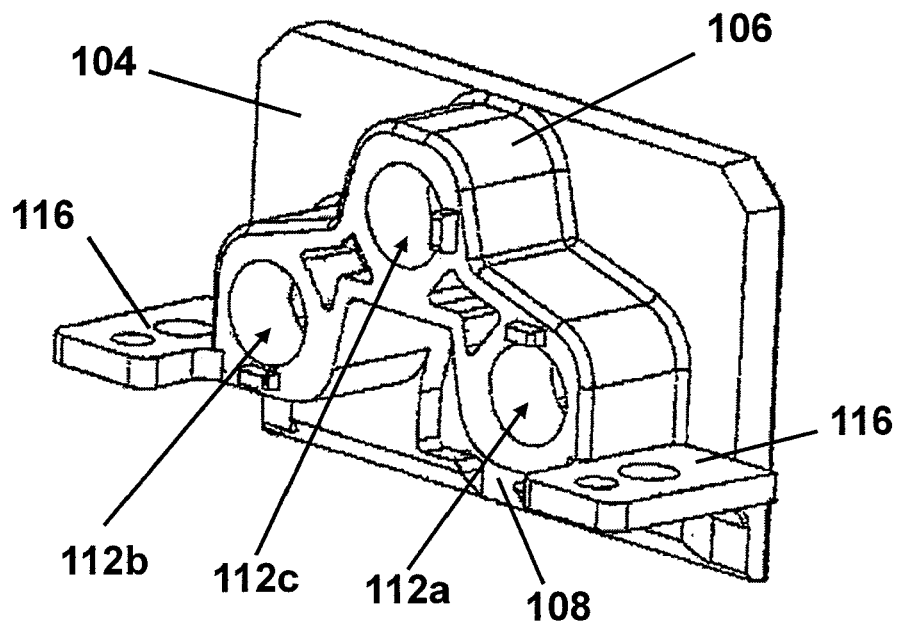

The image sensor 70 and its associated lens as well as the IR LEDs 84 are mounted on a housing assembly 100 that is shown in FIGS. 4A and 4B. As can be seen, the housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 880 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. Mounting flanges 116 are provided on opposite sides of the rear portion 106 to facilitate connection of the housing assembly 100 to the bezel 26 via suitable fasteners. A label 118 formed of retro-reflective material overlies the front surface of the front portion 104. Further specifics concerning the housing assembly and its method of manufacture are described in U.S. Application Publication No. 2011/0170253 to Liu et al. entitled "Housing Assembly for Interactive Input System and Fabrication Method" filed on Feb. 19, 2010, the disclosure of which is incorporated herein by reference in its entirety.

Figure 5:
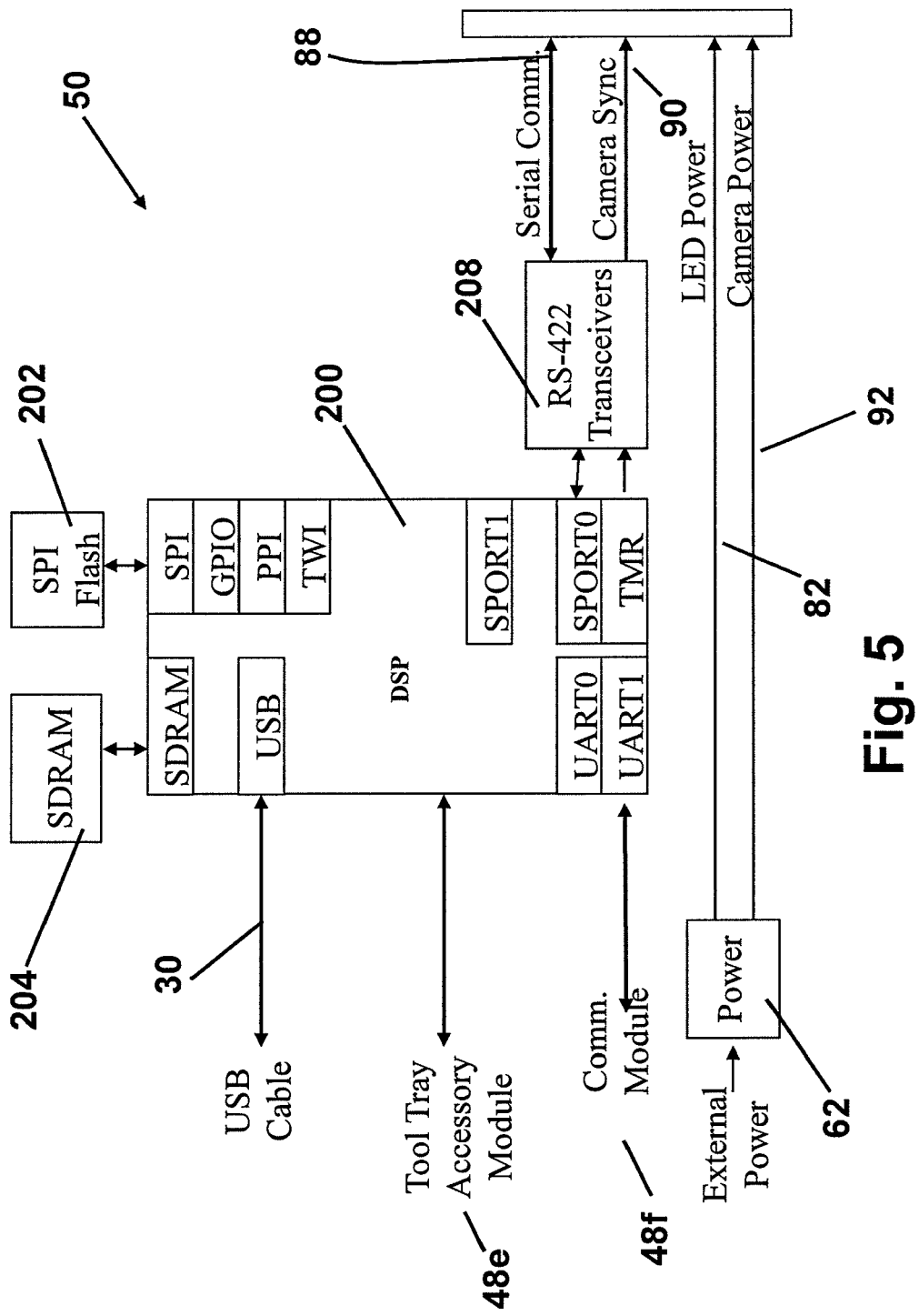
FIG. 5 is a block diagram of a master controller forming part of the interactive input system of FIG. 1.
Figure 6:
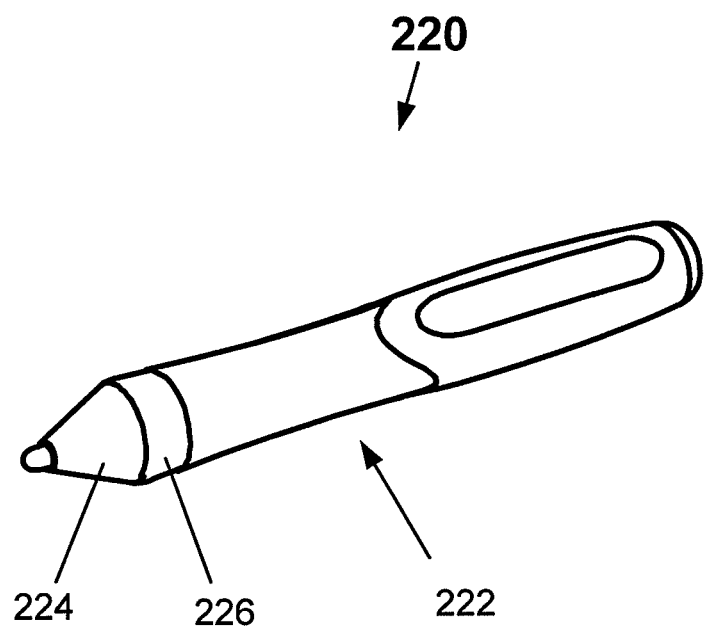
FIG. 6 is a perspective view of a pen tool for use with the interactive input system of FIG. 1.
Figure 7:
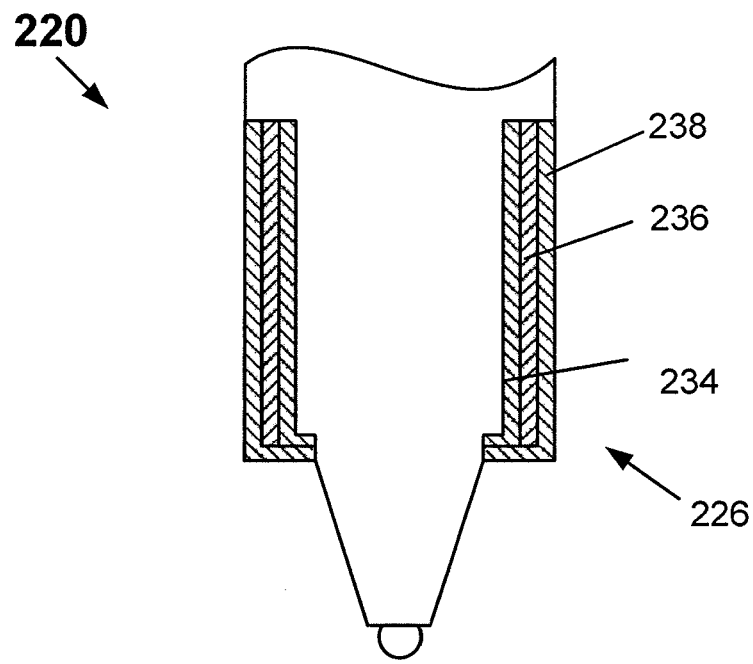
FIG. 7 is a cross-sectional view of a portion of the pen tool of FIG. 6.
Figure 8:
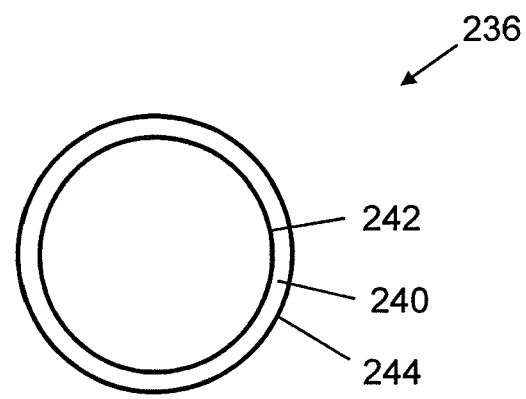
FIG. 8 is cross-sectional view of the tip portion of the pen tool of FIG. 6.

Components of the master controller 50 are shown in FIG. 5. As can be seen, master controller 50 comprises a DSP 200 such as that manufactured by Analog Devices under part number ADSP-BF522 Blackfin or other suitable processing device. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT0) with the imaging assemblies 60 via an RS-422 transceiver 208 over the differential synchronous signal (DSS) communications link 88. In this embodiment, as more than one imaging assembly 60 communicates with the master controller DSP 200 over the DSS communications link 88, time division multiplexed (TDM) communications is employed. The DSP 200 also communicates with the imaging assemblies 60 via the RS-422 transceiver 208 over the camera synch line 90. DSP 200 communicates with the tool tray accessory module 48e over an inter-integrated circuit (I²C) channel and communicates with the communications module 48f over universal asynchronous receiver/transmitter (UART), serial peripheral interface (SPI) and I²C channels.

As will be appreciated, the architectures of the imaging assemblies 60 and master controller 50 are similar. By providing a similar architecture between each imaging assembly 60 and the master controller 50, the same circuit board assembly and common components may be used for both thus reducing the part count and cost of the interactive input system 20. Differing components are added to the circuit board assemblies during manufacture dependent upon whether the circuit board assembly is intended for use in an imaging assembly 60 or in the master controller 50. For example, the master controller 50 may require a SDRAM 76 whereas the imaging assembly 60 may not.

The general purpose computing device 28 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The computing device 28 may also comprise a network connection to access shared or remote drives, one or more networked computers, or other networked devices.

FIGS. 6 to 9 show better illustrate a pen tool 220 for use with the interactive input system 20. Pen tool 220 has a main body 222 terminating in a conical tip 224. In this embodiment, a variable reflector 226 is disposed on the body 222 adjacent the tip 224. Variable reflector 226 has a multilayered structure, and comprises an inner layer 234 comprising a retro-reflective material, an attenuating layer 236 disposed on the inner layer 234, and an outer layer 238 disposed on the attenuating layer 236. The attenuating layer 236 is configured to have an electrically controllable transparency, such that the transmittance of light therethrough is controllable. In this embodiment, the attenuating layer 236 is a polymer dispersed liquid crystal (PDLC) device, and comprises a PDLC film 240 positioned in the annular region between two co-axial, transparent electrodes 242 and 244. The PDLC film 240 comprises a plurality of droplets of liquid crystals dispersed in a polymer matrix. When no voltage is applied between electrodes 242 and 244, the liquid crystals within the droplets assume random orientations, causing the droplets to scatter light when it reaches the PDLC film 240. The scattering of light reduces the amount of light than can pass straight through the PDLC film 240, thus reducing its transparency. However, when a voltage is applied across the electrodes 236 and 238, the liquid crystals within the droplets become partially aligned, causing fewer of the droplets to scatter light passing through the PDLC film 240. The reduced scattering of light increases the amount of light that can pass straight through the PDLC film 240, thus increasing its transparency. The degree of alignment of the droplets within the PDLC film 240, and consequently the level of transparency of the attenuating layer 236, is generally proportional to the applied voltage. Accordingly, the transparency of the attenuating layer 236 may be varied over a range corresponding to the working voltage range of the pen tool 220. The variable reflector 226 is thus capable of controlling the amount of incident light that reaches the inner layer 234 and also the amount of light reflected from the inner layer 234.

The outer layer 238 is fabricated of a durable material that is transparent to infrared light, and functions as a protective barrier for the variable reflector 226. In this embodiment, the outer layer 238 is fabricated of plastic.

Figure 9:
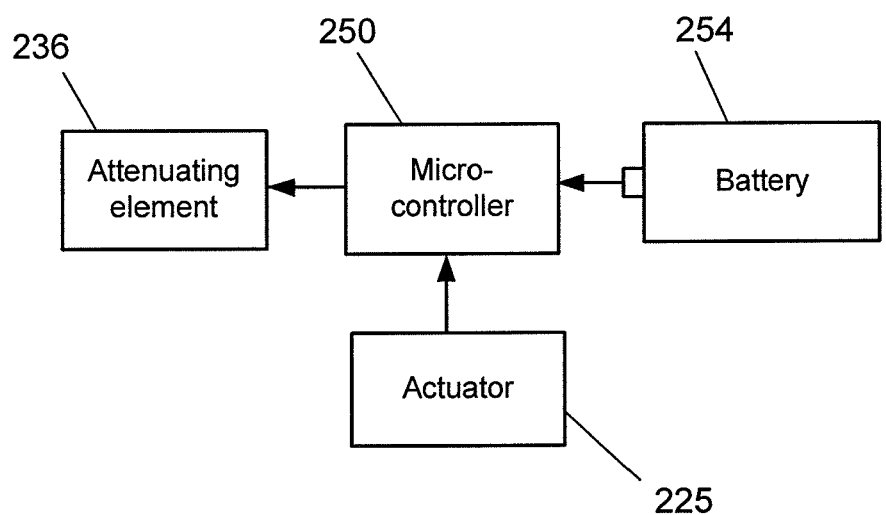
FIG. 9 is a block diagram of components of the pen tool of FIG. 6.

Protruding from the tip 224 is an actuator 225 that resembles a nib. Actuator 225 is biased out of the tip 224 by a spring (not shown) but can be pushed into the tip against the bias of the spring upon application of pressure thereto. Actuator 225 is connected to a microcontroller 250 housed within the main body 222. As shown in FIG. 9, microcontroller 250 is in communication with the attenuating layer 236. When the actuator 225 is depressed, microcontroller 250 is configured to switch the attenuating layer 236 between levels of transparency at one or more modulating frequencies by applying alternating voltage levels to the electrodes using power supplied by a battery 254. This switching of the attenuating layer 236 modulates the amount of IR illumination reaching the variable reflector 226 that is reflected back by the variable reflector 226 during use of the pen tool 220 with the interactive input system 20. In this embodiment, the modulation of the amount of reflected IR illumination is used to identify the pen tool 220 although those of skill in the art will appreciate that the modulation may be performed for other purposes.

During operation, the DSP 200 of the master controller 50 outputs synchronization signals that are applied to the synch line 90 via the transceiver 208. Each synchronization signal applied to the synch line 90 is received by the DSP 72 of each imaging assembly 60 via transceiver 86 and triggers a non-maskable interrupt (NMI) on the DSP 72. In response to the non-maskable interrupt triggered by the synchronization signal, the DSP 72 of each imaging assembly 60 ensures that its local timers are within system tolerances and if not, corrects its local timers to match the master controller 50. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84 are properly powered during the image frame capture cycle. In this embodiment, the pulse sequences and the outputs on the LED control line 174 are generated so that the frame capture rate of each image sensor 70 is eight (8) times the desired image frame output rate.

In response to the pulse sequence output on the snapshot line, the image sensor 70 of each imaging assembly 60 acquires image frames at the desired image frame rate. In this manner, image frames captured by the image sensor 70 of each imaging assembly can be referenced to the same point of time allowing the position of pointers brought into the fields of view of the image sensors 70 to be accurately triangulated. Each imaging assembly 60 has its own local oscillator (not shown) and synchronization signals are distributed so that a lower frequency synchronization signal (e.g. the point rate, 120 Hz) for each imaging assembly 60 is used to keep image frame capture synchronized. By distributing the synchronization signals for the imaging assemblies 60, rather than, transmitting a fast clock signal to each image assembly 60 from a central location, electromagnetic interference is reduced.

During the image frame capture sequence, when each IR LED 84 is on, the IR LEDs flood the region of interest over the interactive surface 24 with infrared illumination Infrared illumination that impinges on the retro-reflective bands of bezel segments 40, 42, 44 and 46 and on the retro-reflective labels 118 of the housing assemblies 100 is returned to the imaging assemblies 60. As a result, in the absence of a pointer, the image sensor 70 of each imaging assembly 60 sees a bright band having a substantially even intensity over its length, together with any ambient light artifacts. When a pointer is brought into proximity with the interactive surface 24, the pointer occludes infrared illumination reflected by the retro-reflective bands of bezel segments 40, 42, 44 and 46 and/or the retro-reflective labels 118. As a result, the image sensor 70 of each imaging assembly 60 sees a dark region that interrupts the bright band in captured image frames. If the pointer is a pen tool 220, the image sensor 70 of each imaging assembly 60 also sees a bright region above the bright band corresponding to reflection of infrared illumination from the variable reflector 226. Additionally, the reflections of the illuminated retro-reflective bands of bezel segments 40, 42, 44 and 46 and the illuminated retro-reflective labels 118 appearing on the interactive surface 24 are also visible to the image sensor 70.

When the IR light sources 82 are off, no infrared illumination impinges on the retro-reflective bands of bezel segments 40, 42, 44 and 46 or on the retro-reflective labels 118 of the housing assemblies 100. Consequently, the image sensor 70 of each imaging assembly 60 does not see the retro-reflective bands or the retro-reflective labels 118. If a pen tool 220 is in proximity with the display surface 24, no infrared illumination impinges on the variable reflector 226 of the pen tool 220 and consequently the image sensor 70 also does not see the variable reflector 226. Each imaging assembly 60 does however see artifacts resulting from ambient light on a dark background.

Figure 10:
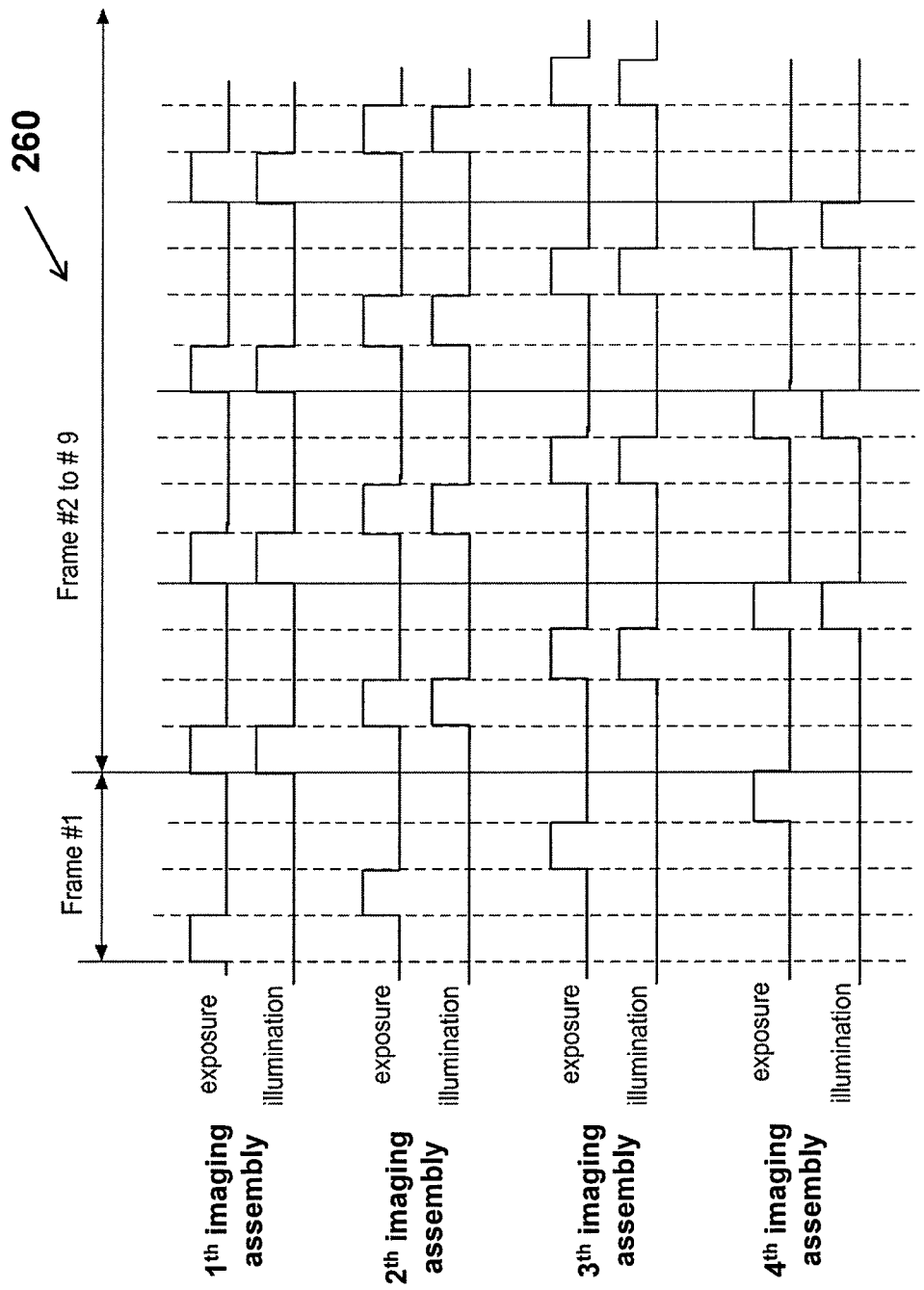
FIG. 10 is a graphical plot of an image frame capture sequence used by the interactive input system of FIG. 1.
Figure 11A:
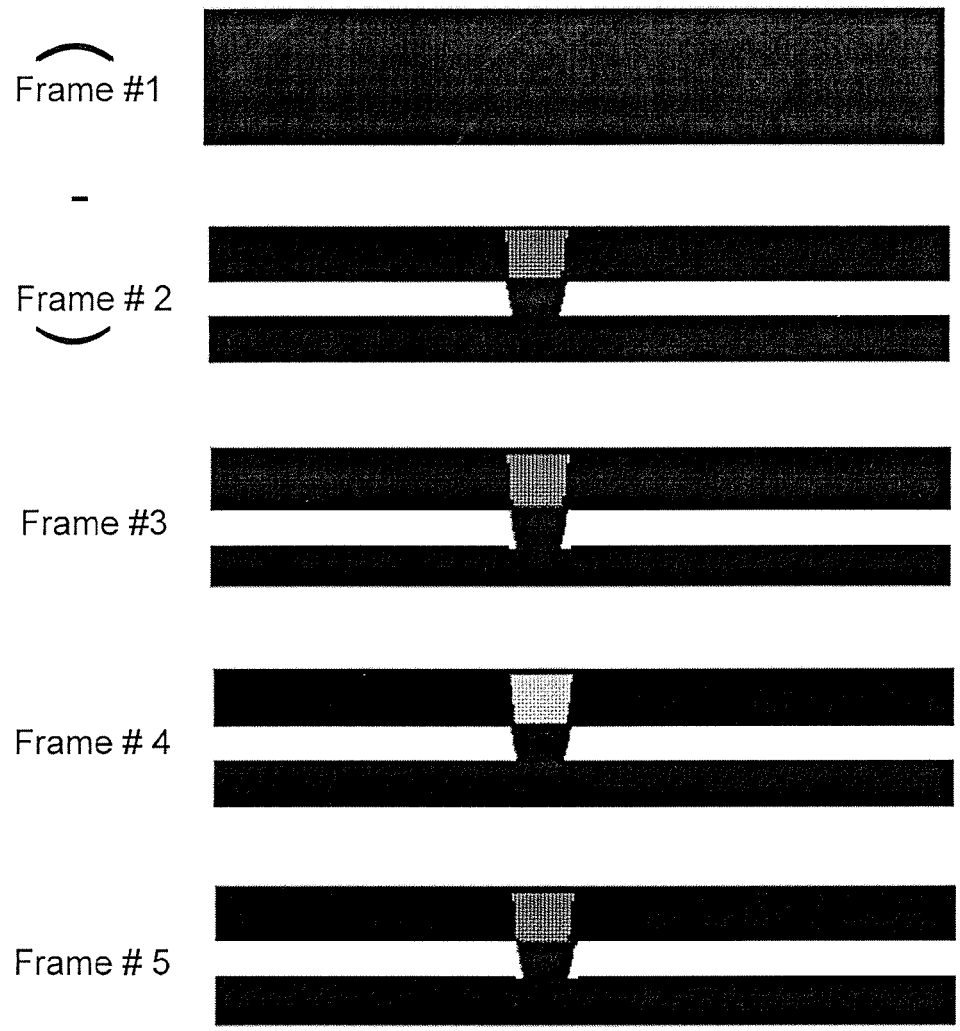
FIGS. 11A and 11B depict a sequence of nine (9) consecutive image frames captured by the imaging assembly of FIG. 3 when the pen tool of FIG. 6 is in the field of view of the imaging assembly and is reflecting illumination modulated according to a subcarrier frequency combination.
Figure 11B:
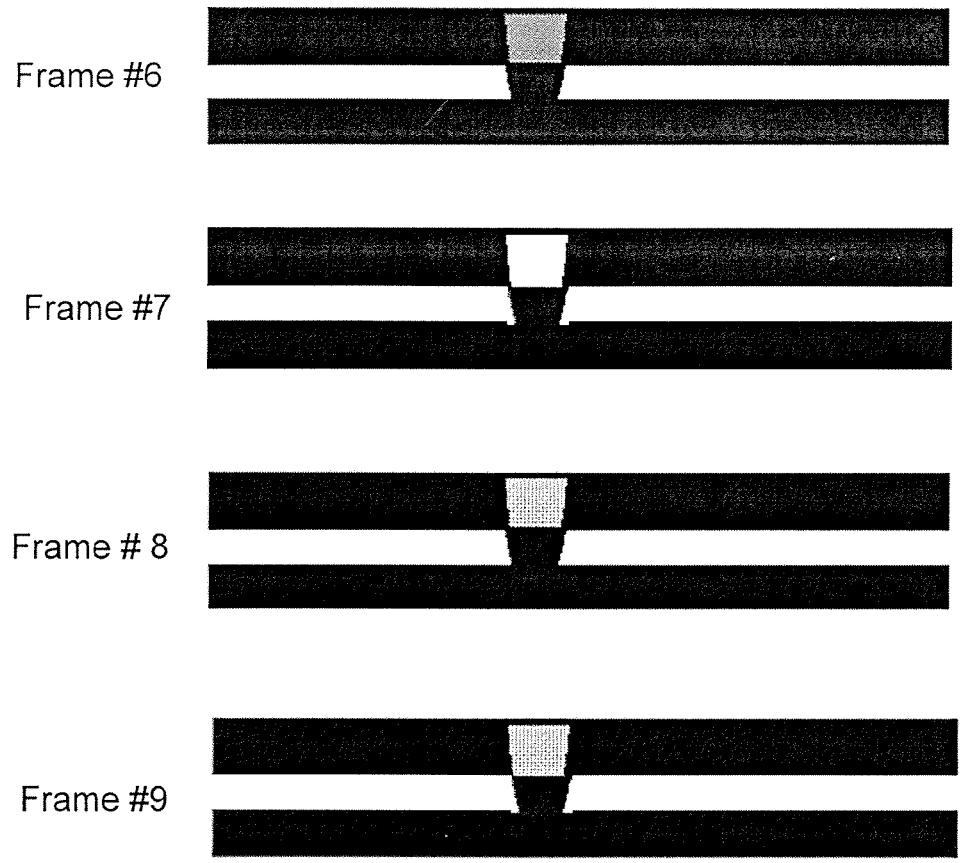

FIG. 10 shows a portion of the image frame capture sequence used by the interactive input system 20, which is generally indicated using reference numeral 260. In this embodiment, each imaging assembly 60 continuously captures image frames that are grouped into image frame sequences and stored in buffers, with each image frame sequence comprising nine (9) image frames. FIGS. 11A and 11B show a sequence of image frames captured by one of the imaging assemblies 60 during the image frame capture sequence 260 when a pen tool is proximate the interactive surface 24. In this embodiment, at each imaging assembly 60, the first image frame ("Frame #1") of each sequence is captured with the IR LEDs 84 off so as to obtain a background image frame, and the following eight (8) image frames (Frame #2 to Frame #9) are captured with the IR LEDs 84 on so as to obtain eight (8) illuminated image frames. To avoid any effects resulting from illumination of neighbouring IR LEDs during image frame capture sequence 260, the exposure of the image sensors 70 of the four (4) imaging assemblies 60 are staggered such that only one image frame is captured at one time. Similarly, the powering of the IR LEDs are also staggered during capture of the illuminated image frames such that each group of IR LEDs 84 is synchronized with its respective image sensor 70. In this embodiment, the cycle rate used by the four (4) image sensors 70 to capture a single image frame is 960 Hz, yielding an exposure time of 1/4×1/960 Hz, or about 260 s for each image sensor 70.

Figure 12:
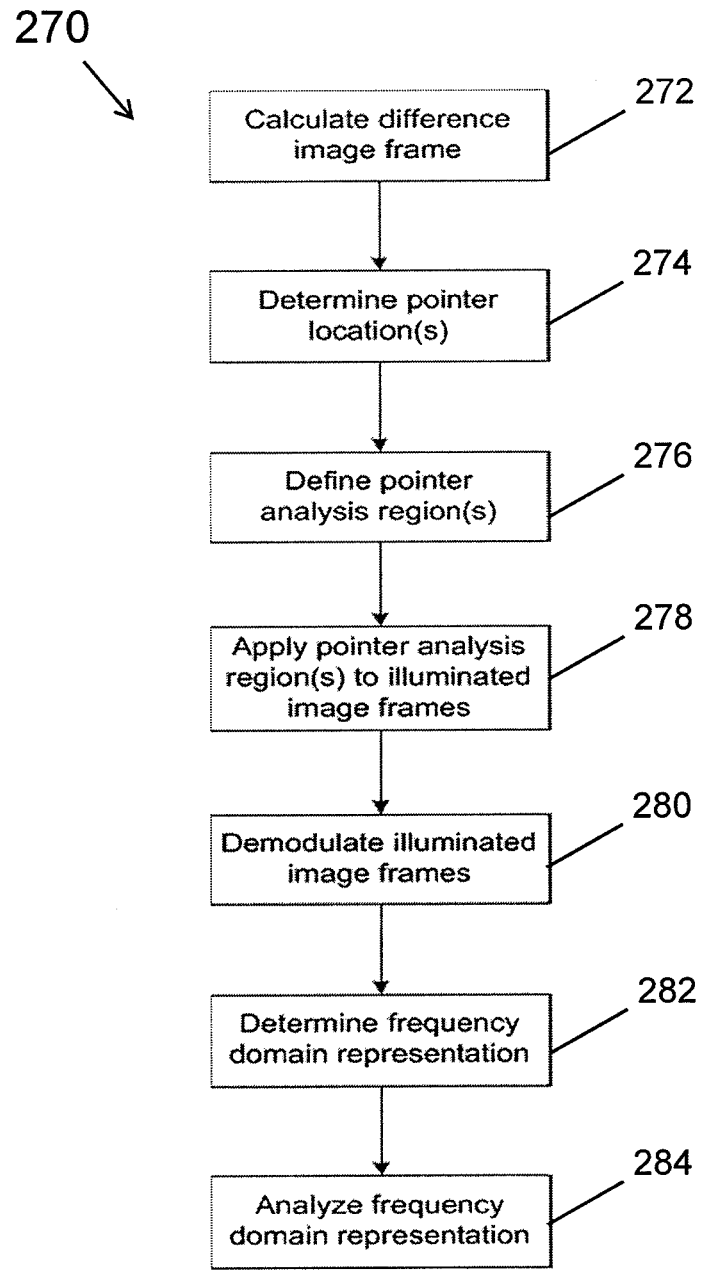
FIG. 12 is a flowchart showing steps of an image processing method.

Once the sequence of image frames has been captured, each DSP 72 subjects the image frames in the sequence to an image frame processing method, which is generally shown in FIG. 12 and identified by reference numeral 270. To reduce the effects ambient light may have on pointer discrimination, the background image frame is subtracted from the first illuminated image frame (i.e. Frame #2) so as to yield a difference image frame having ambient light removed (step 272). The ambient light removed in this step comprises light originating from the operating environment surrounding the interactive input system 20, and infrared illumination emitted by the IR LEDs 84 that is scattered off of objects proximate to the imaging assemblies 60.

The difference image frame is then examined for values that represent the bezel and possibly one or more pointers (step 274). Methods for determining pointer location within image frames have been described in U.S. Patent Application Publication No. 2009/0277697 to Bolt et al., entitled "Interactive Input System and Pen Tool Therefor", the disclosure of which is incorporated herein by reference in its entirety. Thus, the locations of dark regions interrupting the bright band in the difference image frame are analyzed. As will be appreciated, a pen tool 220 in proximity with the interactive surface 24 will give rise to a generally dark region that results from the occlusion of infrared illumination reflected from the retro-reflective band of the bezel segments by the tip 224.

Once the locations of one or more pointers in the difference image frame have been determined, the DSP 72 then defines one or more square-shaped pointer analysis regions that are generally centered on the area directly above the bezel at each pointer location (step 276). Image data within the pointer analysis region is used for determining if pointer information presented by a subcarrier frequency combination has been received. If the pointer is a pen tool 220, the pointer analysis region will encompass at least a portion of the region corresponding to the variable reflector 226 and will have a bright appearance as a result of the IR illumination reflected therefrom.

In this embodiment, the transparency of the attenuating layer 236 of each pen tool 220, and therefore the intensity of IR illumination reflected by the variable reflector 226, is varied using a combination of three subcarrier frequencies, namely 120 Hz, 240 Hz, and 360 Hz. In this embodiment, the transparency of the attenuating layer 236 is varied sinusoidally at each subcarrier frequency used. Turning again to FIGS. 11A and 11B, it can be seen that the intensity of the bright region representing the variable reflector 226 in the image frames varies as a result of the modulation of the IR illumination reflected therefrom.

Figure 13:
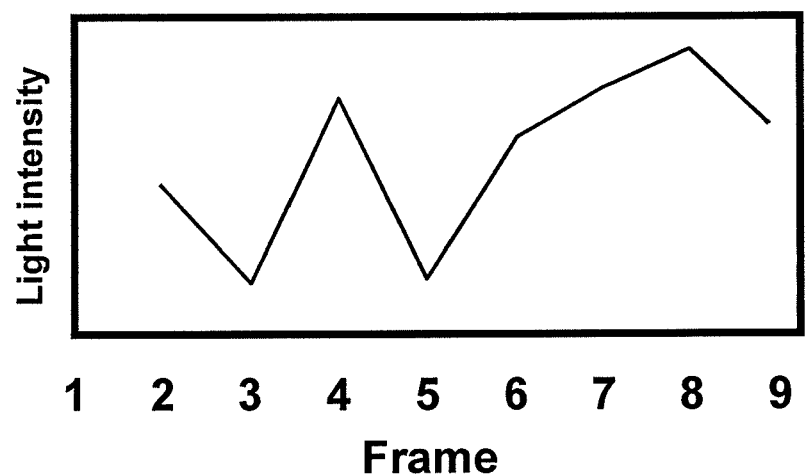
FIG. 13 is a graphical plot of the light intensity variation of the image frames of FIGS. 11A and 11B.
Figure 14:
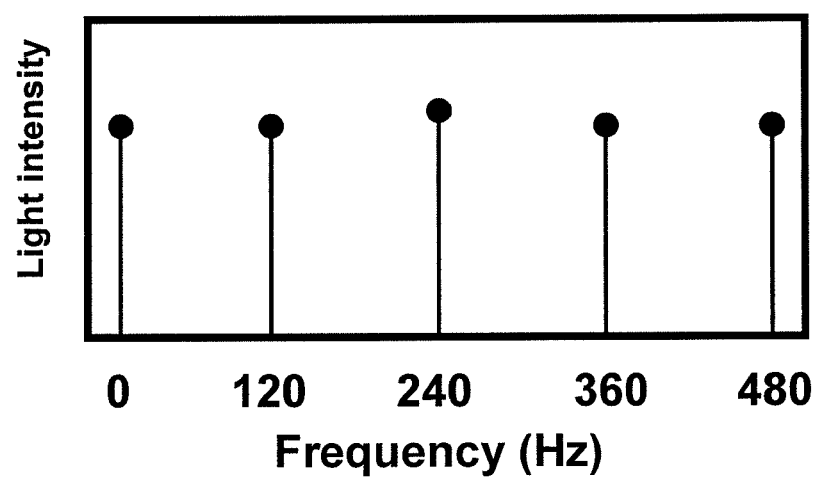
FIG. 14 is a graphical plot of the frequency domain representation of the image frame light intensity variation of FIG. 13.

Having defined the one or more pointer analysis regions, the DSP 72 applies the one or more pointer analysis regions to each of the eight (8) illuminated image frames stored in the buffer (step 278). The DSP 72 then carries out a demodulation of the illuminated image frames (step 280) and measures the total light intensity within the pointer analysis region(s) for each illuminated image frame. This measured total light intensity is dealt with as a function of image frame number and gives rise to a light intensity variation. An example of such a light intensity variation is graphically plotted in FIG. 13. The DSP 72 then performs a time frequency transform on the light intensity variation to yield a frequency domain representation of light intensity (step 282), which is plotted graphically in FIG. 14. In this embodiment, the transform is a discrete Fourier transform, but those of skill in the art will understand that any transform from the time domain to the frequency domain may be used. For a frame rate of 960 frames per second, an eight point discrete Fourier transform will report frequencies of 0 Hz, 120 Hz, 240 Hz, 360 Hz, and 480 Hz. The measurement at 0 Hz represents light from all constant light sources, including ambient light and the bias applied to active pen tool IR illumination, and is discarded. The measurement at 480 Hz represents light from the oscillating IR LEDs 84 and is also discarded. The remaining measurements at 120 Hz, 240 Hz, and 360 Hz represent modulated subcarriers of IR illumination reflected by the pen tool 220.

The available carrier frequencies used by pen tools 220 are dependent on the frame rate (i.e. the frame capture rate) of the image sensors 70. In this embodiment as mentioned previously, the frame rate is 960 frames per second. Therefore, to avoid aliasing at this frame rate, the upper limit of modulation frequency used for the attenuating layer 236 is 480 Hz.

The three subcarrier frequencies, namely 120 Hz, 240 Hz, and 360 Hz that are used by the pen tool 220 to modulate reflected IR illumination correspond to the normalized frequencies pi/4, pi/2 and 3pi/4 of the maximum modulation frequency (480 Hz). Each pen tool 220 may modulate the reflected IR light using a different combination of the three subcarrier frequencies. In this embodiment, the pen tool 220 operates each subcarrier frequency in either an "on" state or an "off" state. This permits a total of eight (or $2^n$, where n is the number of subcarrier frequencies available) different subcarrier frequency combinations each having a unique modulation pattern that can be recognized by the interactive input system 20. The combination with all three subcarrier frequencies off is reserved by the interactive input system 20 for pointers that are not active pen tools, such as, for example a finger. This provides seven other unique subcarrier frequency combinations for use with pen tools 220. As each unique subcarrier frequency combination can be assigned to a different respective pen tool 220, this information enables the identity of the active pen tool to be recognized by the interactive input system 20. As will be appreciated, the identity information may be used to assign an attribute to the pen tool, such as pen colour, line thickness or functionality (e.g. passive pointer/no functionality, left mouse click, right mouse click, black, red, green, blue, and eraser, respectively), or the identify information may be used to represent a different user (e.g. users 1 through 8, respectively). The eight subcarrier frequency combinations are tabulated below in Table 1.

TABLE 1

| Combination no. | Subcarrier #1 | Subcarrier #2 | Subcarrier #3 |
| --- | --- | --- | --- |
| 1 | off | off | off |
| 2 | on | off | off |
| 3 | off | on | off |
| 4 | off | off | on |
| 5 | on | on | off |
| 6 | on | off | on |
| 7 | off | on | on |
| 8 | on | on | on |

Figure 15A:
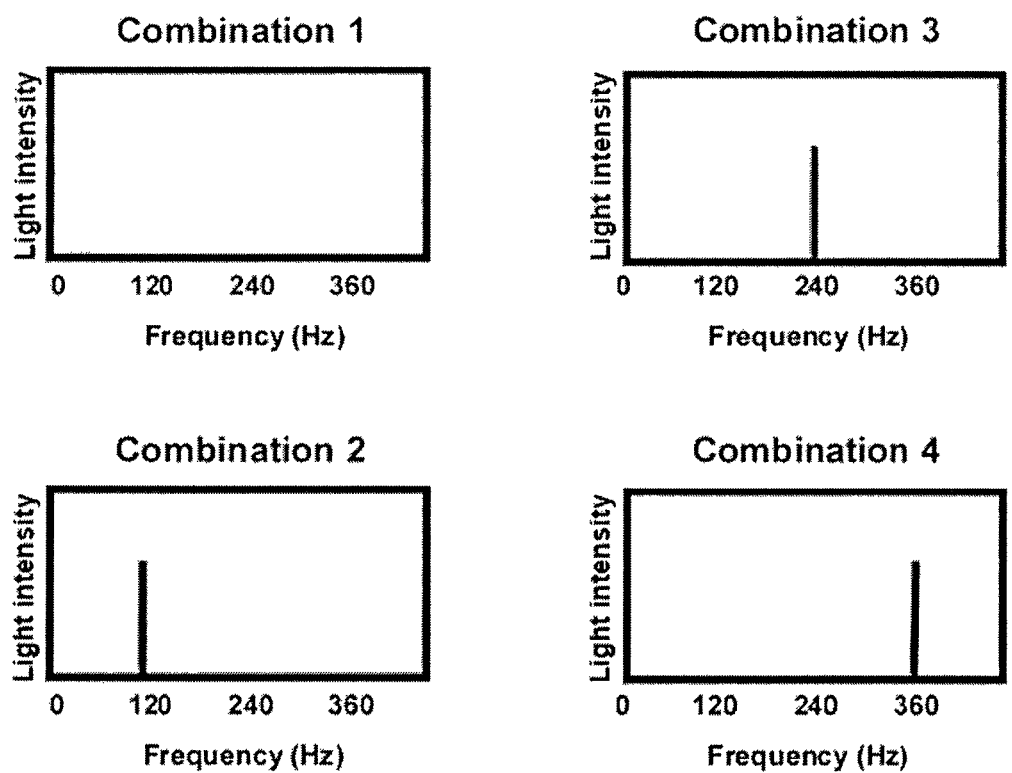
FIGS. 15A and 15B show frequency domain representations of the light intensity of eight (8) subcarrier frequency combinations.
Figure 15B:
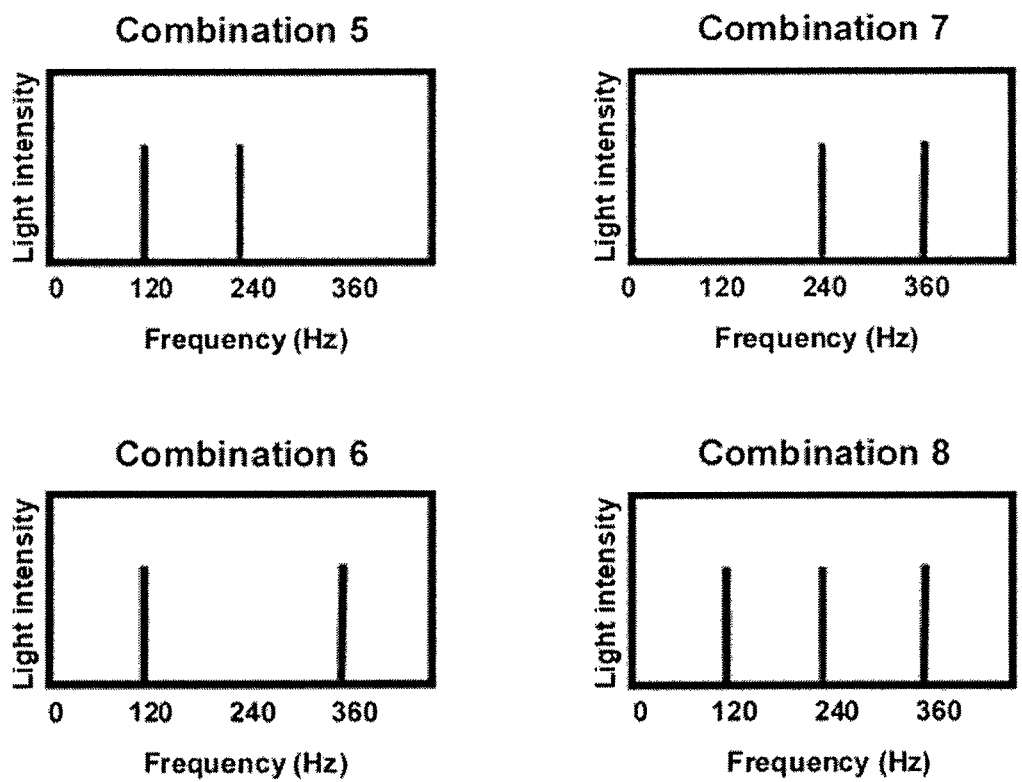

The frequency domain representations of each of these eight subcarrier frequency combinations are graphically plotted in FIGS. 15A and 15B. The DSP 72 determines the identity of the pen tool 220 by analyzing the frequency domain representation of the light intensity variation and determining which frequencies are present above a certain threshold (step 284). If no frequencies are present in the frequency domain representation, as in the case of combination 1, then the interactive input system 20 determines that the pointer is not a pen tool 220.

After the location, the identity and the tip pressure (if available) of the pointer have been determined by the DSP 72 of each imaging assembly 60, each DSP 72 then conveys the pointer data representing the position of the pointer in the image frames as well as the pointer shape and contact status (actual contact or hover) to the DSP 200 of the master controller 50. The DSP 200 uses the pointer data received from the DSPs 72 to calculate the position of each pointer relative to the interactive surface 24 in (x,y) coordinates using well known triangulation as described in above-incorporated U.S. Pat. No. 6,803,906 to Morrison et al. The pointer coordinate data along with pointer identity, pointer shape and contact status is conveyed to the general purpose computing device 28 allowing the image data presented on the interactive surface 24 to be updated.

Figures 16A, 16B, 16C:
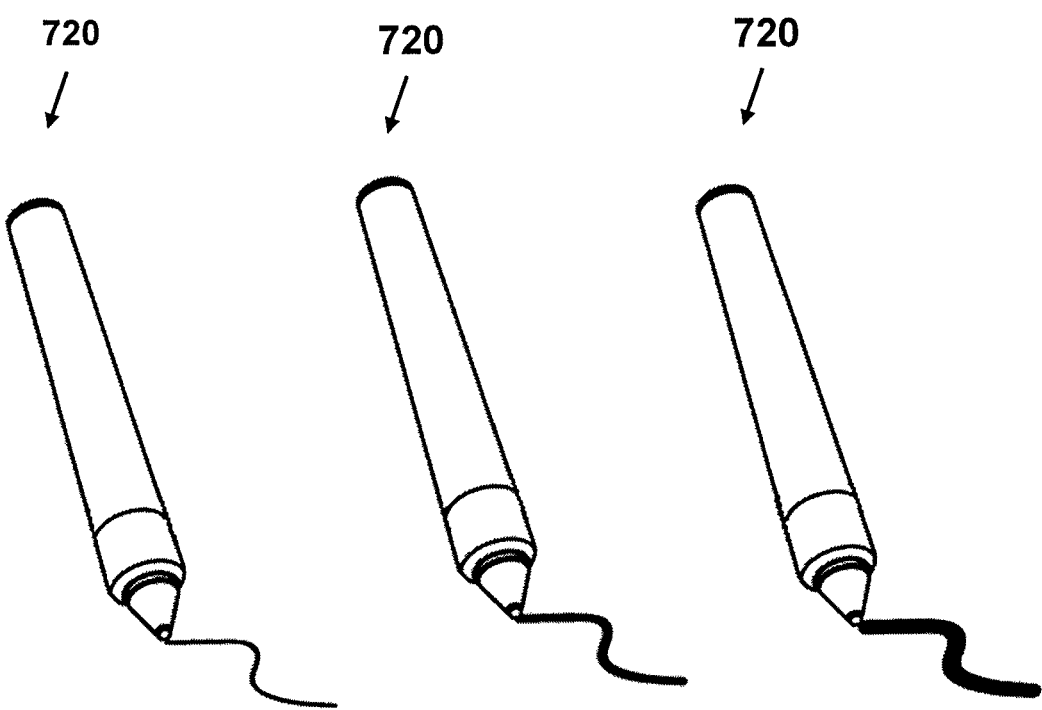
FIGS. 16A to 16C are perspective views of an input surface of the interactive input system of FIG. 1, showing a pressure-sensitive pen tool applying light pressure input, medium pressure input, and heavy pressure input, respectively.
Figure 17A:
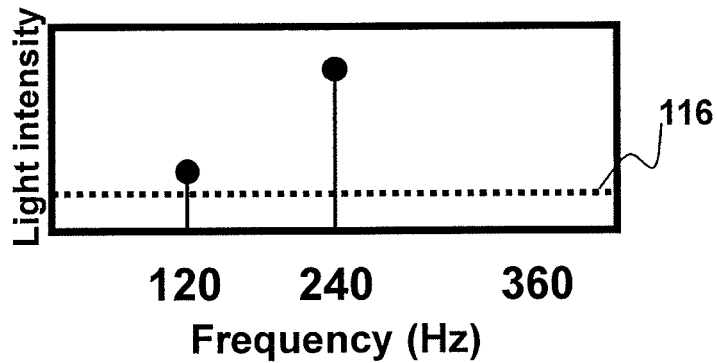
FIGS. 17A to 17C show frequency domain representations of light intensity corresponding to the light, medium and heavy pressure inputs of FIGS. 16A to 16C, respectively.
Figure 17B:
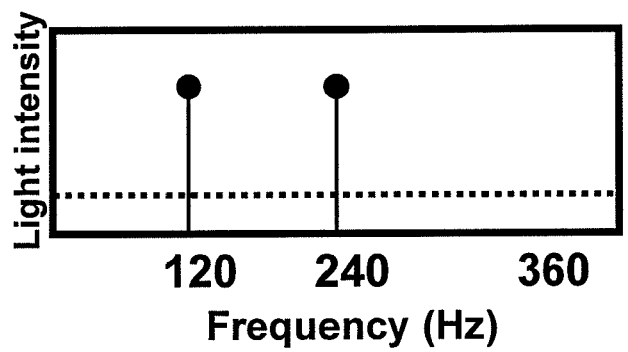
Figure 17C:
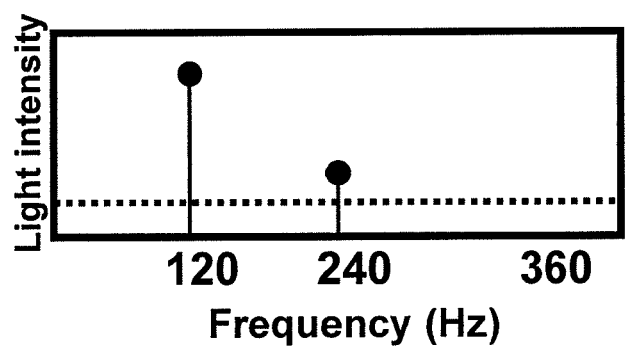

If desired, additional information about the pen tool, such as the level of pressure applied to the pen tool tip, may be communicated by the pen tool 220 by increasing both the number of subcarrier frequencies available for modulation as well as the frame rate of the imaging assemblies 60. Alternatively, the amplitude of the subcarrier frequencies may be varied. This method can be used for the subcarrier frequency combinations that comprise more than one subcarrier frequency, namely combinations 5, 6, 7 and 8 in FIGS. 15A and 15B. Pen tools using these subcarrier frequency combinations may be encoded such that the level of pen tip pressure is manifested as a difference in amplitude of one or more subcarrier frequencies. FIGS. 16A to 16C each schematically illustrate the motion of a pen tool 220 across the interactive surface 24, during which the pressure applied by the tip of the pen tool 220 to the interactive surface is light (FIG. 16A), medium (FIG. 16B) and heavy (FIG. 16C). The corresponding subcarrier frequency signal modulation is plotted graphically in FIGS. 17A to 17C. The difference in amplitude of the subcarrier frequencies for different combinations is kept on the order of +1-25% to maintain the intensity of all subcarriers above the threshold for detection. Pen tools using subcarrier frequency combinations comprising fewer than two subcarrier frequencies, namely subcarrier frequency combinations 1, 2, 3, and 4, could be assigned to pen tool functions that do not require pressure sensitivity, such as for example "eraser", "right click", "left click" and the like.

To utilize such a pressure sensitive feature, the pen tools 220 may comprise a pressure-sensitive tip, such as one that is configured to inform microcontroller 250 as to the depth within the pen tool it has been depressed. In particular, the pressure-sensitive tip may comprise a pressure sensor coupled to the actuator 225. Pen tools without a pressure-sensitive tip could still be used with a pressure-sensitive capable interactive input system, but would give rise to an intensity profile in which the subcarrier frequencies have the same amplitude.

Figure 18:
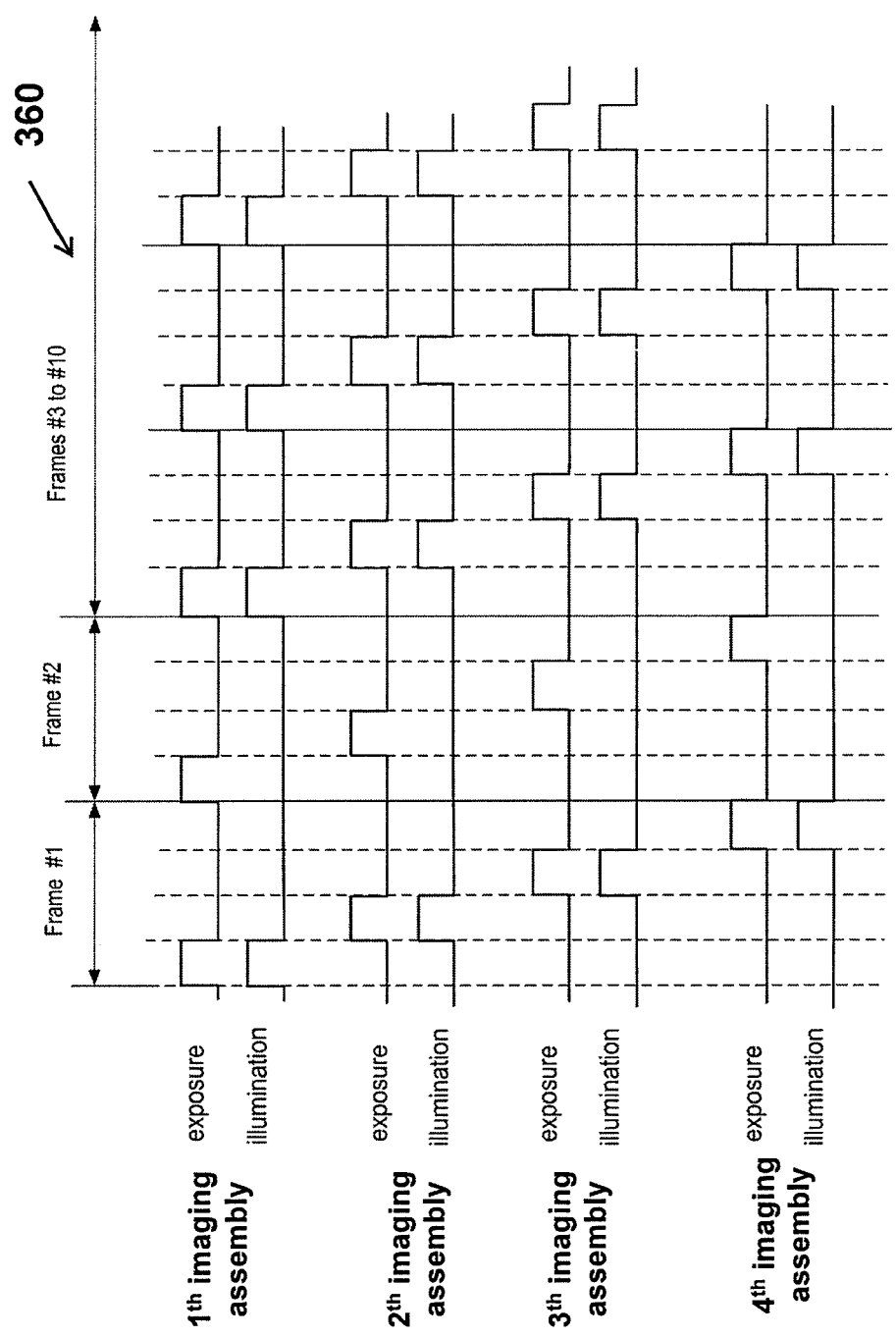
FIG. 18 is a graphical plot of another embodiment of an image frame capture sequence used by the interactive input system of FIG. 1.

The image frame capture sequence is not limited to that described above and, in other embodiments, other image frame capture sequences may be used. For example, FIG. 18 shows a portion of another embodiment of an image frame capture sequence used by the interactive input system 20, and which is generally indicated using reference numeral 360. In this embodiment, each image frame capture sequence comprises ten (10) image frames. The first image frame ("Frame #1") of each sequence is captured with the IR LEDs 84 on so as to obtain a preliminary illuminated image frame. The second image frame ("Frame #2") of each sequence is captured with the IR LEDs 84 off so as to obtain a background image frame. The following eight (8) image frames ("Frame #3" to "Frame #10") are captured with the IR LEDs 84 on to obtain illuminated image frames. The exposure of the image sensors 70 of the four (4) imaging assemblies 60 and the powering of the IR LEDs 84 are staggered to avoid any effects resulting from illumination of neighbouring IR LEDs.

Once the sequence of image frames has been captured and stored in the buffers, each DSP 72 subjects the image frames in the sequence to an image frame processing method 370, which is similar to image frame processing method 270 described above. In this embodiment, the background image frame ("Frame #2") is subtracted from the preliminary illuminated image frame (i.e. Frame #1) so as to yield a difference image frame, and one or more pointer analysis regions are applied to the following eight (8) illuminated image frames ("Frame #3" to "Frame #10") stored in the buffer. The DSP 72 carries out a demodulation of these eight (8) illuminated image frames.

Figure 19:
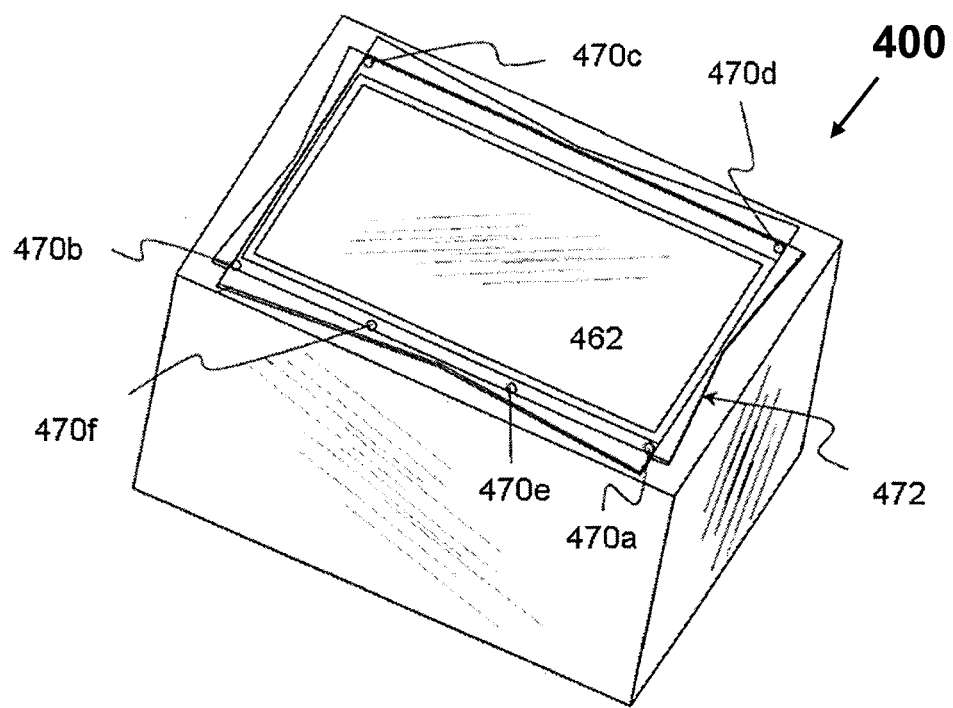
FIG. 19 is another embodiment of an interactive input system.
Figure 20:
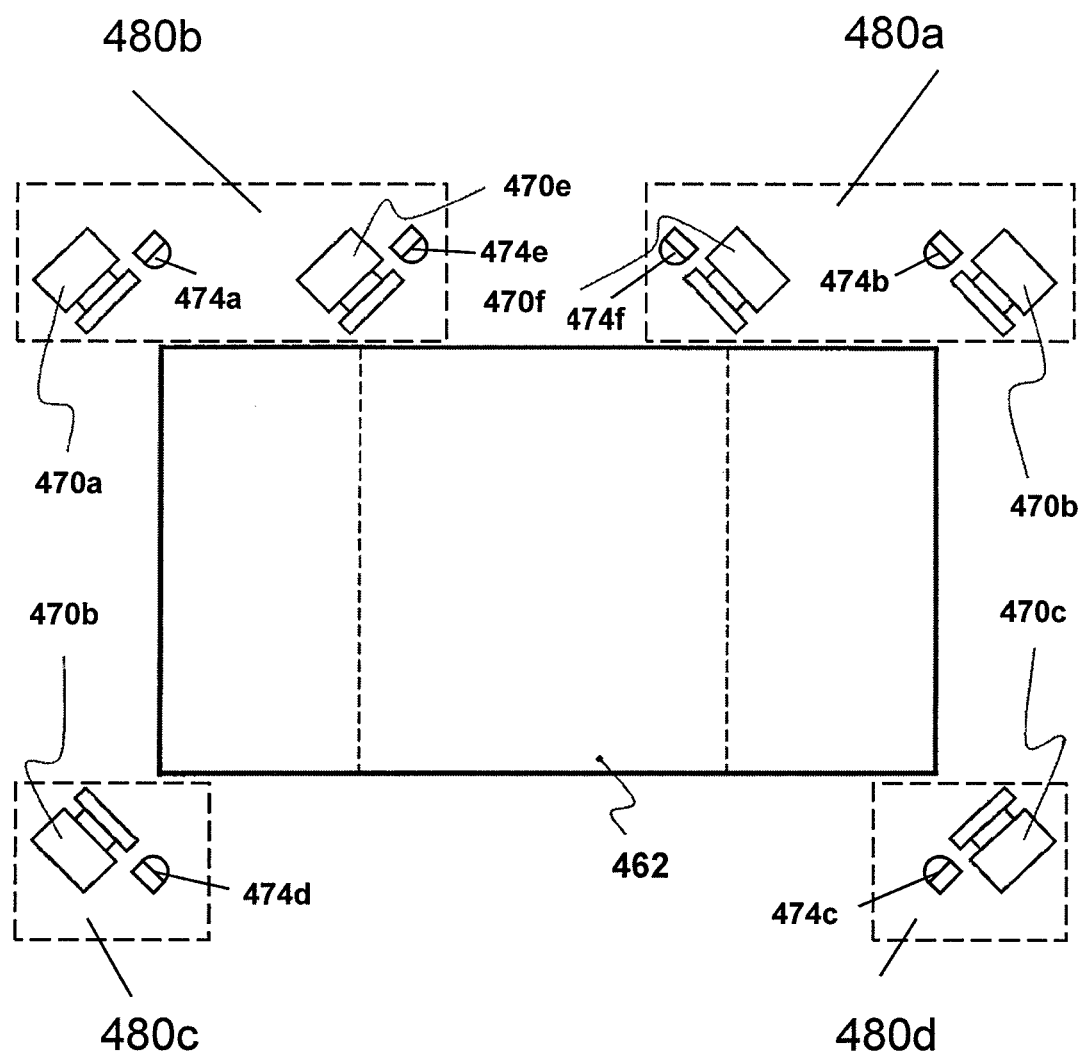
FIG. 20 is a schematic plan view of an imaging assembly arrangement forming part of the interactive input system of FIG. 19.

The pen tool 220 described above is not only for use with interactive input system 20 described above, and may alternatively be used with other interactive input systems employing machine vision. For example, FIGS. 19 and 20 show another embodiment of an interactive input system in the form of a touch table, and which is generally referred to using reference numeral 400. Interactive input system 400 is similar to that described in U.S. Patent Application Publication No.

2011/0006981 to Chtchetinine et al. entitled "INTERACTIVE INPUT SYSTEM" filed on Jul. 10, 2009, assigned to SMART Technologies, ULC, the disclosure of which is incorporated herein by reference in its entirety. Interactive input system 400 comprises six (6) imaging assemblies 470a to 470f positioned about the periphery of the input area 462, and which look generally across the input area 462. An illuminated bezel 472 surrounds the periphery of the input area 462 and generally overlies the imaging assemblies 470a to 470f. The illuminated bezel 472 provides backlight illumination into the input area 462. To detect targets, processing structure of interactive input system 400 utilizes a weight matrix method disclosed in PCT Application Publication No. WO 2011/003205 to Chtchetinine et al. entitled "INTERACTIVE INPUT SYSTEM AND METHOD" filed on Jul. 12, 2010, assigned to SMART Technologies, ULC, the disclosure of which is incorporated herein by reference in its entirety.

Each imaging assembly 470a to 470f comprises a respective IR LED 474a to 474f that is configured to flood the input area 462 with infrared illumination. In this embodiment, the imaging assemblies 470a to 470f are grouped into four (4) imaging assembly banks, namely: a first imaging assembly bank 480a comprising imaging assemblies 470b and 470f; a second imaging assembly bank 480b comprising imaging assemblies 470a and 470e; a third imaging assembly bank 480c comprising imaging assembly 470d; and a fourth imaging assembly bank 480d comprising imaging assembly 470c. The imaging assemblies within each bank capture image frames simultaneously. Similarly, the IR LEDs within each bank flood the input area 462 with infrared illumination simultaneously.

Figure 21:
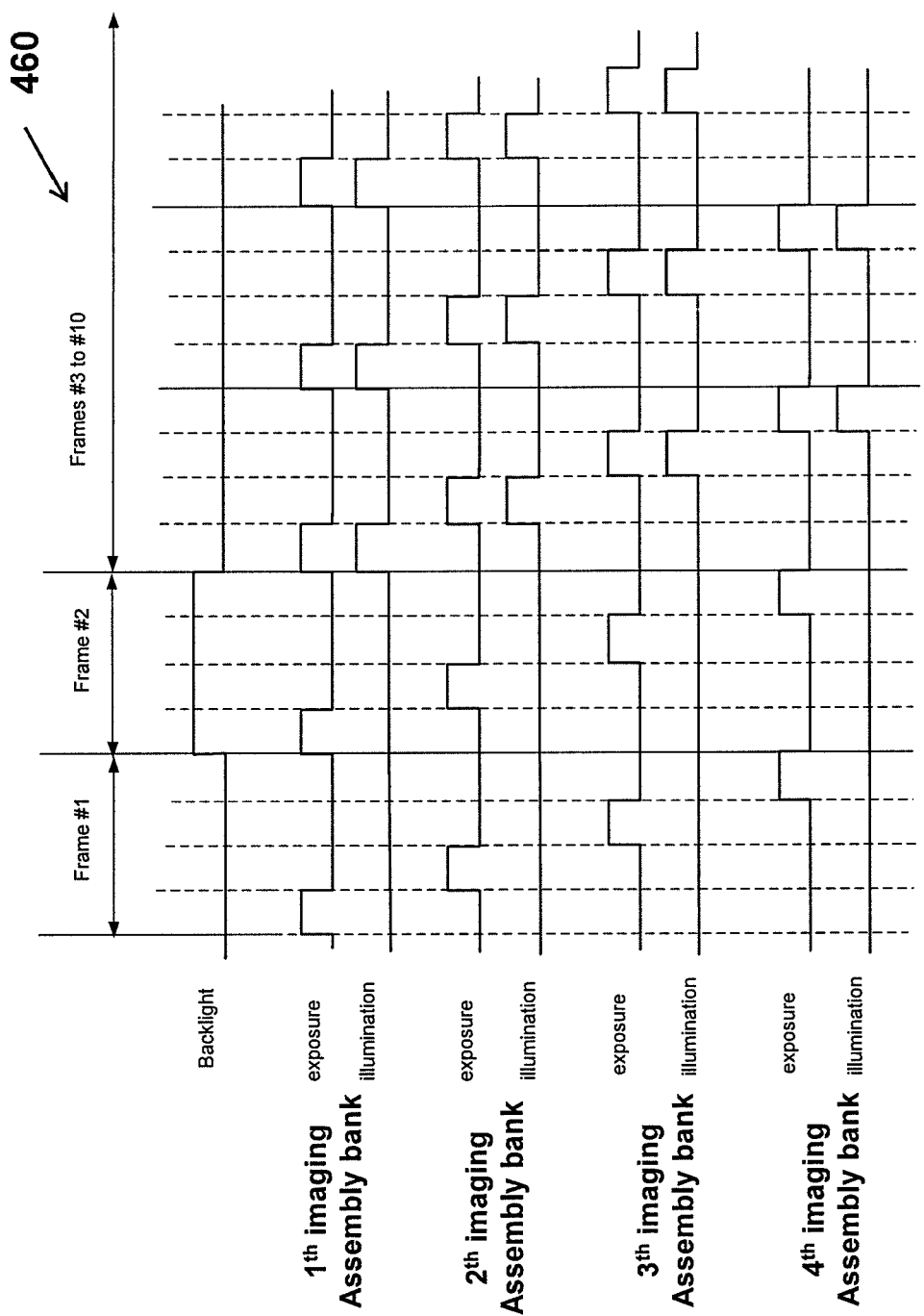
FIG. 21 is a graphical plot of an image frame capture sequence used by the interactive input system of FIG. 19.

FIG. 21 shows a portion of the image frame capture sequence used by the interactive input system 400, which is generally indicated using reference numeral 460. Each imaging assembly bank continuously captures image frames that are grouped into sequences, with each sequence comprising ten (10) image frames. In this embodiment, the first image frame of each sequence is captured with the illuminated bezel 472 off and with the IR LEDs 474a to 474f off, so as to obtain a background image frame. The second image frame of each sequence is captured with the illuminated bezel 472 on and with the IR LEDs 474a to 474f off, so as to obtain a preliminary illuminated image frame. The following eight (8) image frames are captured with the illuminated bezel 472 off and with the IR LEDs 474a to 474f on, so as to obtain illuminated image frames for each respective imaging assembly bank 480a to 480d. Similar to image frame capture sequence 260 described above, the exposure of the image sensors of the four (4) imaging assembly banks 480a to 480d and the illumination of the IR LEDs 474a to 474f are staggered to avoid any effects resulting from illumination of neighbouring IR LEDs.

Once the sequence of image frames has been captured and stored in the buffers, the image frames of the sequence are subjected to an image frame processing method similar to image frame processing method 270 illustrated in FIG. 12 to determine the identity of one or more pen tools 220 by analyzing the frequency domain representation of the light intensity variation. In this embodiment, the background image frame ("Frame #1") is subtracted from the preliminary illuminated image frame (i.e. Frame #2) so as to yield a difference image frame, and one or more pointer analysis regions are applied to the following eight (8) illuminated image frames ("Frame #3" to "Frame #10") stored in the buffer. The DSP 72 carries out a demodulation of these eight (8) illuminated image frames.

Figure 22:
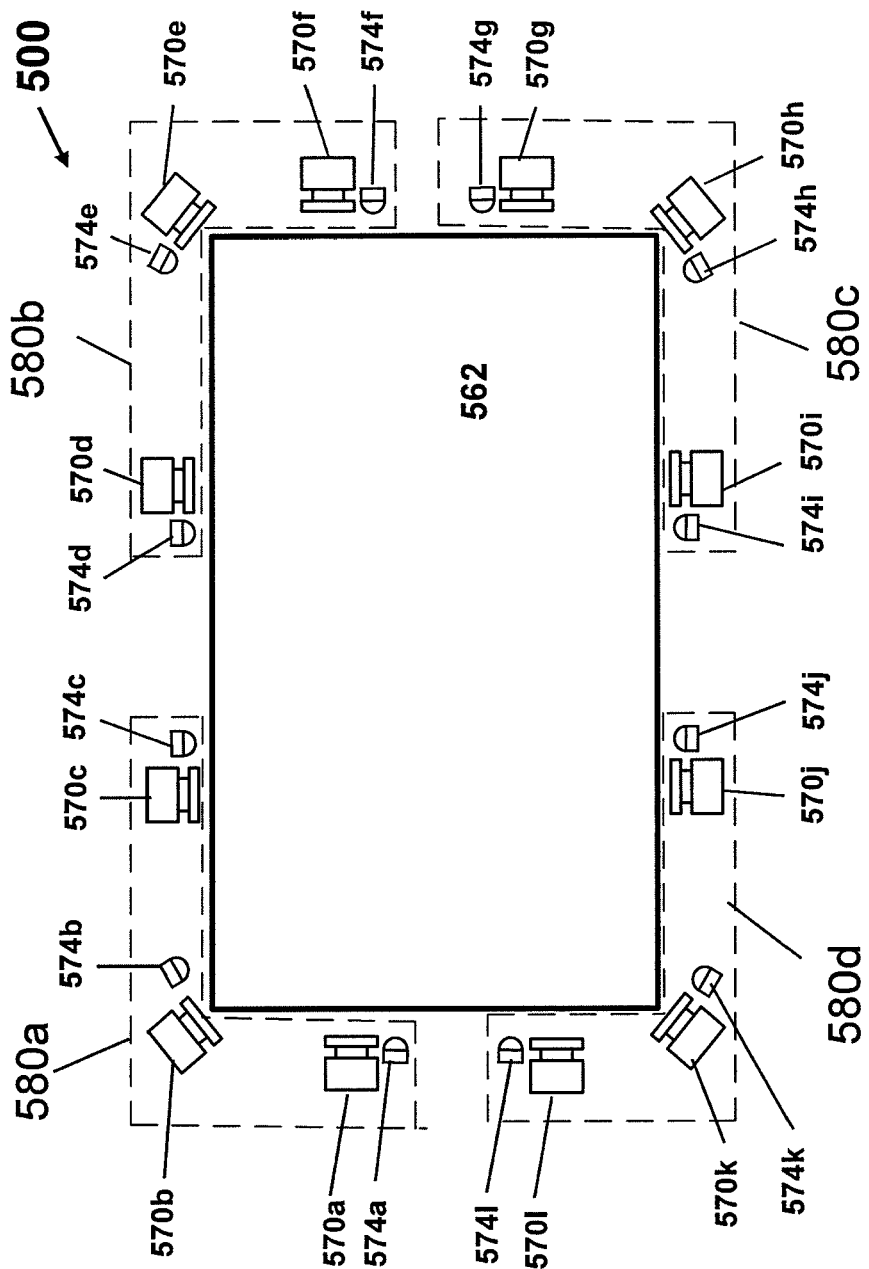
FIG. 22 is a schematic plan view of another embodiment of an imaging assembly arrangement for the interactive input system of FIG. 19.

The pen tool 220 may be used with still other interactive input systems employing machine vision. For example, FIG. 22 shows another embodiment of an interactive input system in the form of a touch table, and which is generally referred to using reference numeral 500. Interactive input system 500 is generally similar to interactive input system 400 described above and with reference to FIGS. 20 and 21, however interactive input system 500 comprises twelve (12) imaging assemblies 570a to 570l positioned about the periphery of the input area 562, and which look generally across the input area 562. Each imaging assembly 570a to 570l comprises a respective IR LED 574a to 574l that is configured to flood the input area 562 with infrared illumination.

In this embodiment, the imaging assemblies 570a to 570l are grouped into four (4) imaging assembly banks, namely: a first imaging assembly bank 580a comprising imaging assemblies 570a to 570c; a second imaging assembly bank 580b comprising imaging assemblies 570d to 570f; a third imaging assembly bank 580c comprising imaging assemblies 570g to 570i; and a fourth imaging assembly bank 580d comprising imaging assembly 570j to 570l. Similar to interactive input system 400 described above, the imaging assemblies within each bank capture image frames simultaneously, and the IR LEDs within each bank flood the input area 562 with infrared illumination simultaneously.

Figure 23:
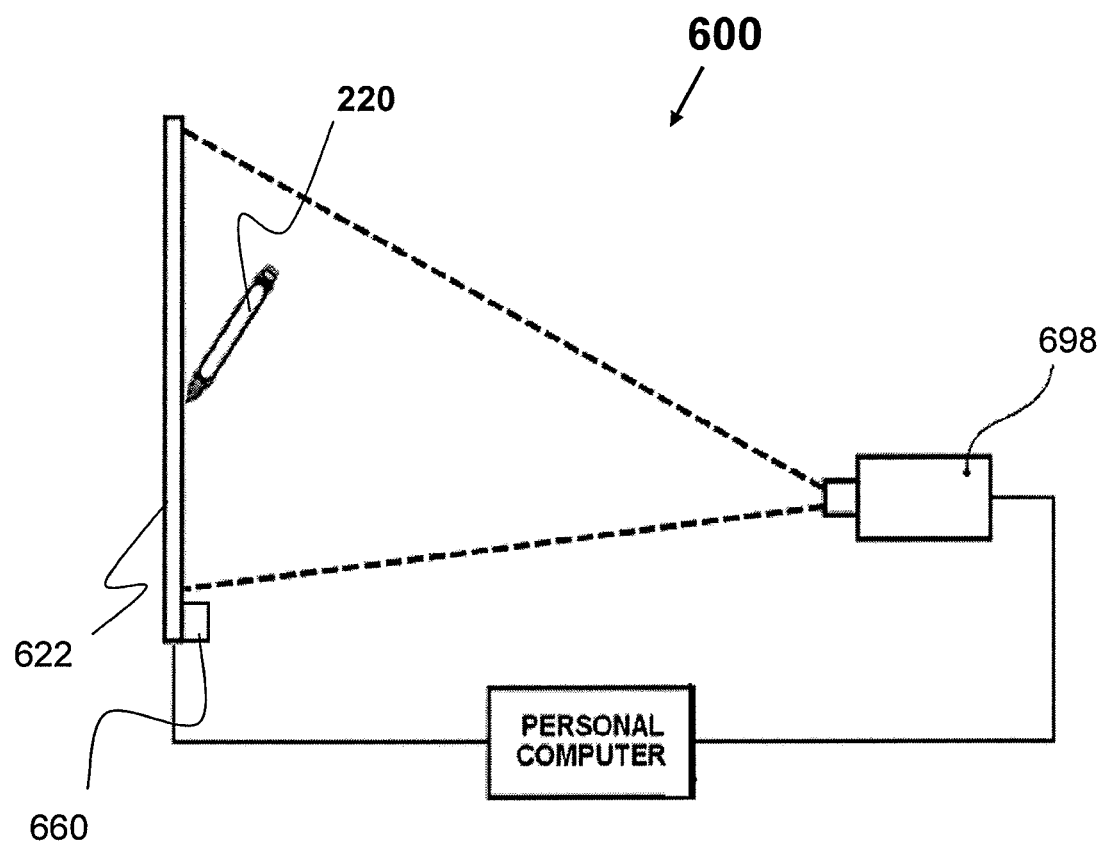
FIG. 23 is another embodiment of an interactive input system.

Pen tool 220 may be used with still other interactive input systems. For example, FIG. 23 shows another embodiment of an interactive input system 600 comprising an assembly 622 surrounding a display surface of a front projection system. The front projection system utilizes a projector 698 that projects images on the display surface. Imaging assemblies 660 positioned at the bottom corners of the assembly 622 look across the display surface. Each imaging assembly 660 is generally similar to imaging assembly 60 described above and with reference to FIGS. 1 to 15, and comprises an image sensor and a set of IR LEDs mounted on a housing assembly. A DSP unit receives image frames captured by the imaging assemblies 660 and carries out the image processing method described previously to locate the position of each pointer brought into proximity with the display surface and to determine if information is being communicated by a pen tool 220.

Figure 24:
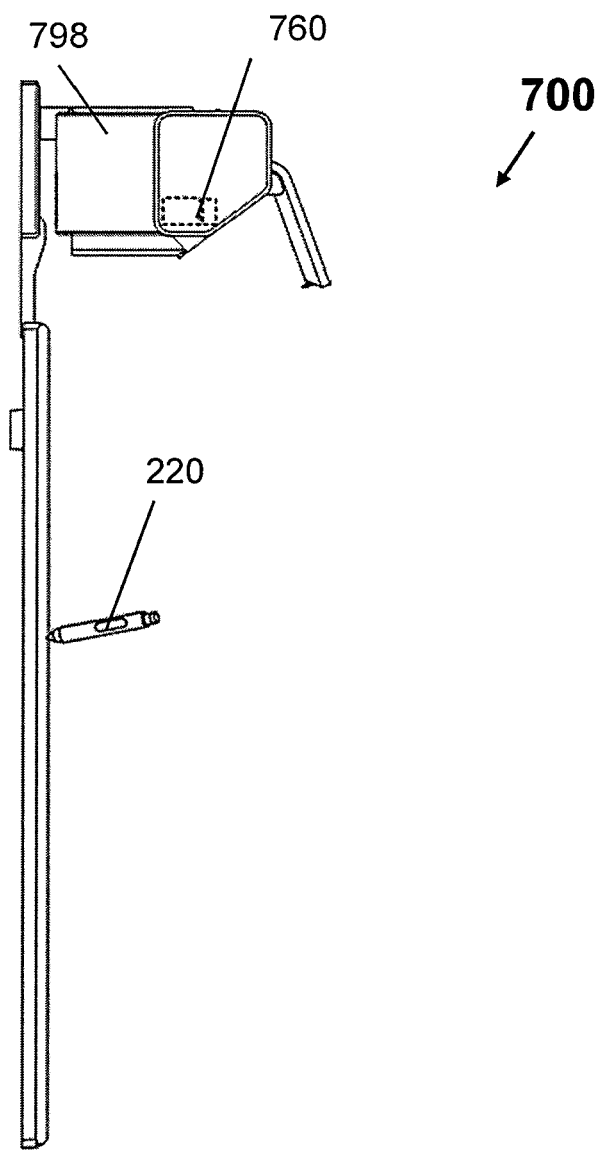
FIG. 24 is another embodiment of an interactive input system.

FIG. 24 shows another embodiment of an interactive input system using a front projection system. Interactive input system 700 comprises a single imaging assembly 760 positioned in proximity to a projector 798 and configured for viewing the display surface. Imaging assembly 760 is generally similar to imaging assembly 60 described above and with reference to FIGS. 1 to 15, and comprises an image sensor and a set of IR LEDs mounted on a housing assembly. A DSP unit receives image frames captured by the imaging assembly 760 and carries out the image processing method described previously to locate the position of a pointer brought into proximity with the display surface and to determine if information is being communicated by a pen tool 220.

Figure 25:
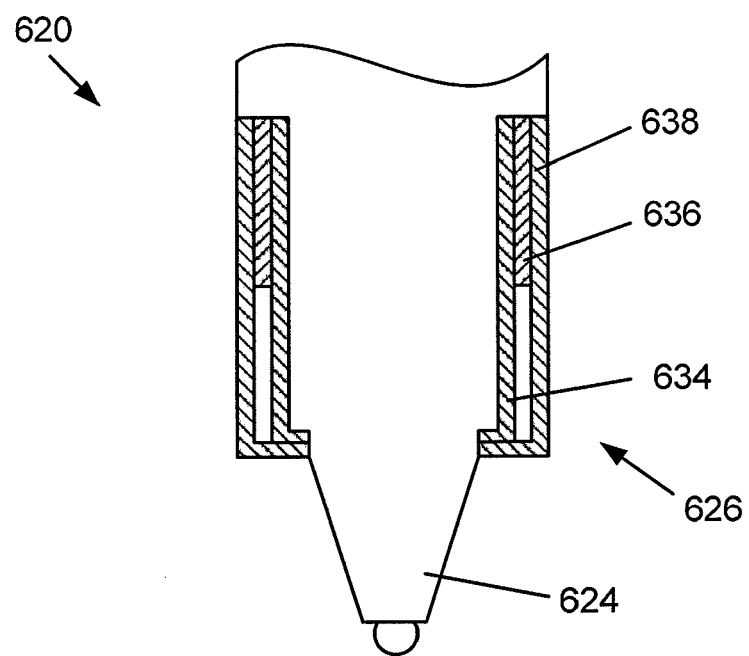
FIG. 25 is a partial cross-sectional view of a portion of another embodiment of a pen tool.

FIG. 25 shows another embodiment of a pen tool, and which is generally indicated using reference numeral 620. Pen tool 620 is generally similar to pen tool 220 described above and with reference to FIGS. 6 to 9, and comprises a variable reflector 626 adjacent a conical tip 624. Similar to pen tool 620, variable reflector 626 has a multilayered structure, and comprises an inner layer 634 comprising a retroreflective material, an attenuating layer 636 disposed on the inner portion 634, and an outer layer 638 disposed on the attenuating layer 636. In this embodiment, the attenuating layer 636 is a polymer dispersed liquid crystal (PDLC) device. The outer layer 638 is fabricated of a durable material transparent to infrared light, and in this embodiment, the outer layer 638 is fabricated of a plastic. Protruding from the tip is an actuator that resembles a nib. The actuator is biased out of the tip 624 by a spring (not shown) but can be pushed into the tip upon application of pressure thereto. The actuator is connected to a microcontroller (not shown) housed within the main body of the pen tool 620. The microcontroller is in communication with the attenuating layer 636. When the actuator is depressed, the microcontroller is configured to switch the attenuating layer 636 between alternating levels of transparency at one or more modulating frequencies using power supplied by a battery (not shown). This switching of the attenuating layer 636 modulates IR illumination reflected by the variable reflector 626, for enabling the interactive input system 20 to determine the identity of the pen tool 620.

In the embodiment shown in FIG. 25, the attenuating layer 636 does not extend the axial length of the inner layer 634, and covers only an upper portion of the inner layer 634. Attenuating layer 636 is therefore configured to attenuate illumination reflecting from only an upper portion of the variable reflector 626. As a result, illumination reflected from a lower portion of variable reflector 626 is not attenuated, enabling pen tools 620 to be readily distinguished from other forms of pointers by the interactive input system 20.

Figure 26:
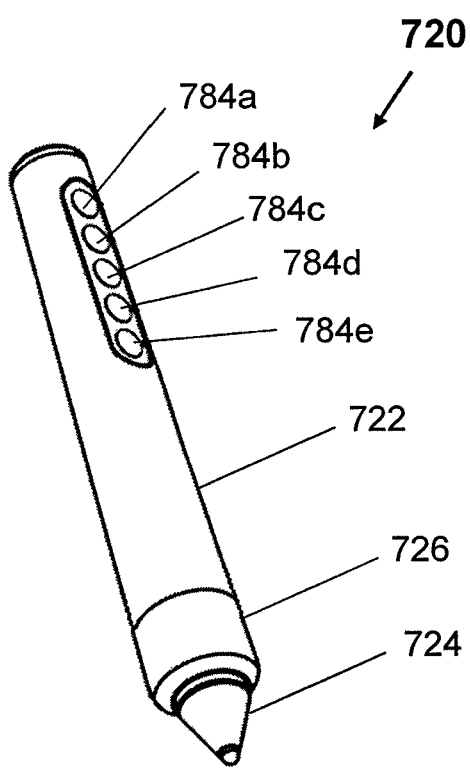
FIG. 26 is a perspective view of another embodiment of a pen tool.

Still other configurations of the pen tool are possible. For example, FIG. 26 shows another example of a pen tool and which is generally identified by reference numeral 720. Pen tool 720 is generally similar to pen tool 220 described above and with reference to FIGS. 6 to 9, and comprises a main body 722 that terminates in a conical tip 724. Pen tool 720 further comprises a variable reflector 726 adjacent the conical tip 724 that is similar to variable reflector 226 described above and with reference to FIGS. 6 to 9. The pen tool 720 further comprises a microcontroller (not shown) housed within the main body 722, which is configured to switch the attenuating layer of variable reflector 726 between differing levels of transparency at one or more modulating frequencies using power supplied by a battery (not shown). This switching of the attenuating layer modulates the IR illumination reflected by the variable reflector 726 during use of the pen tool 720.

Figures 27A, 27B, 27C:
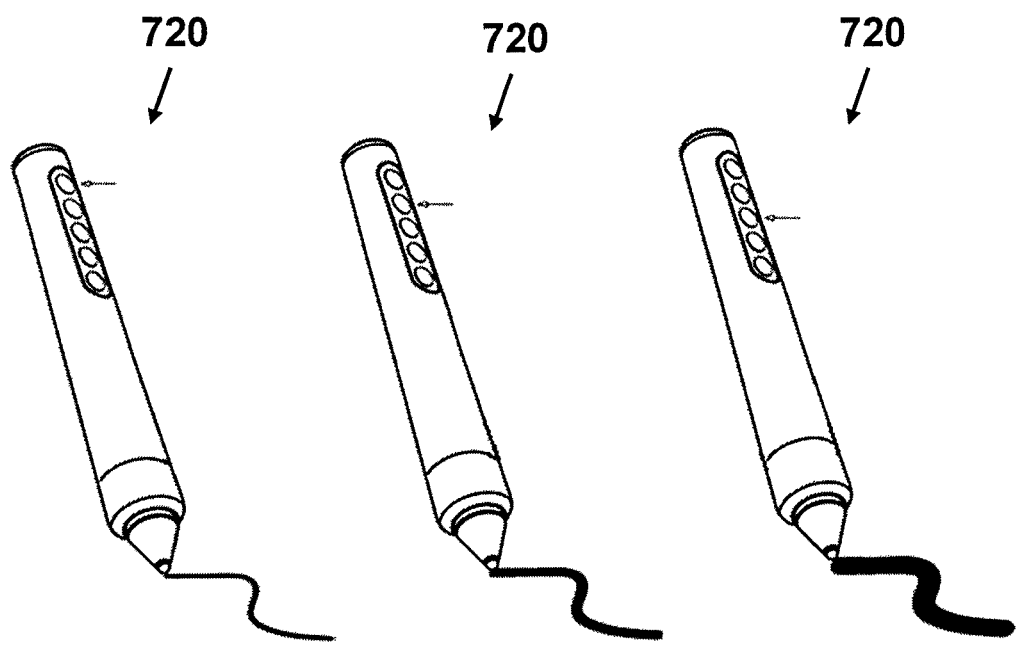
FIGS. 27A to 27E are perspective views of the pen tool of FIG. 26 applying input in accordance with various different selected attributes.
Figures 27D, 27E:
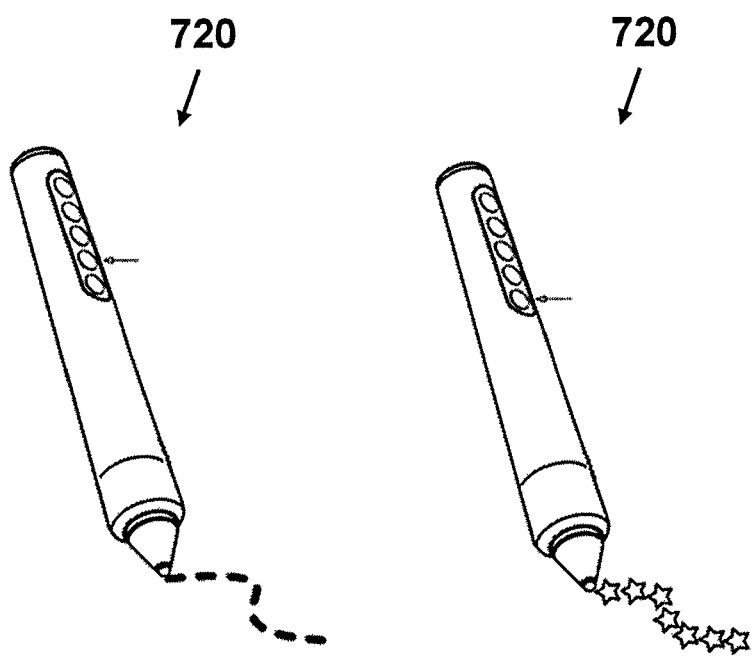

Pen tool 720 further comprises a series of five (5) buttons 784a to 784e disposed on the surface of the main body 722 that are in communication with the microcontroller. Each of the buttons 784a to 784e is associated with a different combination of one or more modulating frequencies used to switch the attenuating layer. Selection of one of the buttons 784a to 784e enables a different attribute of the pen tool 720 to be selected by the user. In the embodiment shown, button 784a is associated with digital ink having a narrow width (FIG. 27A); button 784b is associated with digital ink having a medium width (FIG. 27B); button 784c is associated with digital ink having a wide width (FIG. 27C); button 784d is associated with dashed digital ink (FIG. 27D); and button 784e is associated with star-shaped digital ink (FIG. 27E).

Figure 28:
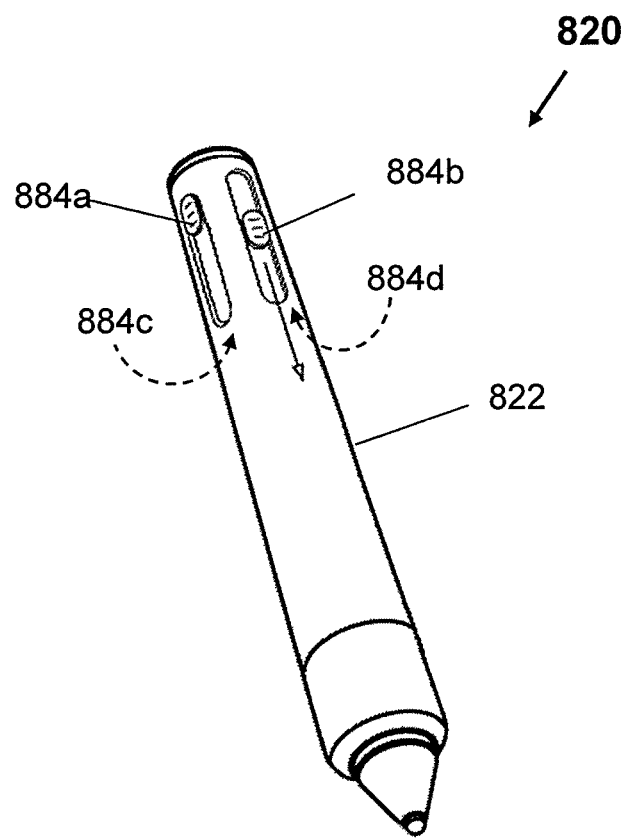
FIG. 28 is a perspective view of another embodiment of a pen tool.

Still other variations are possible. For example, FIG. 28 shows another pen tool and which is generally identified by reference numeral 820. Pen tool 820 is generally similar to pen tool 720 described above and with reference to FIG. 26, and comprises a combination of slidable switches 884a, 884b, 884c and 884d that are disposed on the surface of the main body 822 and that are in communication with a microcontroller (not shown). As with buttons 784a to 784e described above with respect to pen tool 720, each of the slidable switches 884a to 884d is associated with a different set of one or more modulating frequencies used to switch the attenuating layer. Selection of one of the slidable switches 884a to 884d enables a different attribute of the pen tool 820 to be selected by the user.

Figure 29:
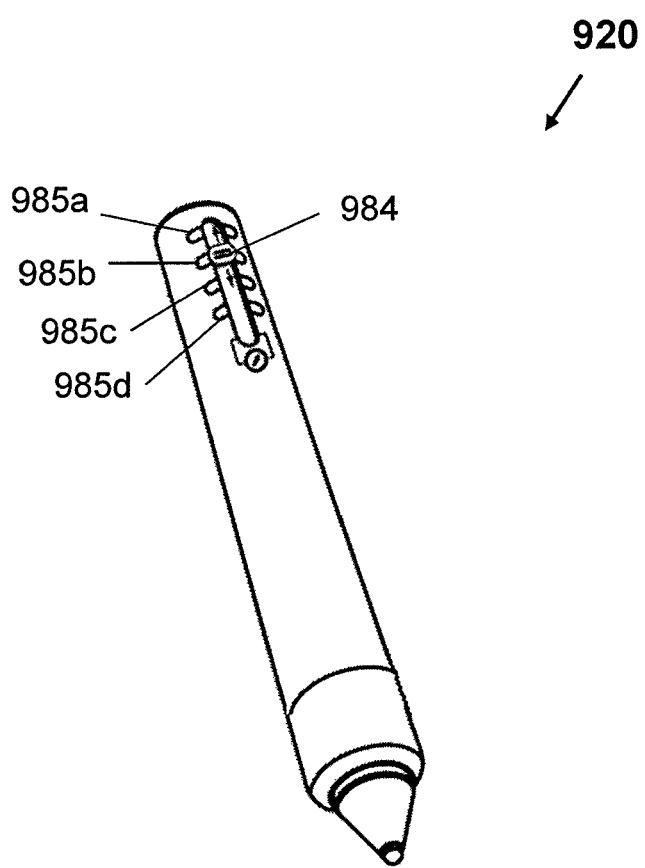
FIG. 29 is a perspective view of another embodiment of a pen tool.

FIG. 29 shows another example of a pen tool and which is generally identified by reference numeral 920. Pen tool 920 is generally similar to pen tool 720 described above and with reference to FIG. 26, and comprises a multi-position slidable switch 984 in communication with a microcontroller (not shown). Multi-position slidable switch 984 has a set of four (4) different indexed switch positions 985a to 985d, each of which is associated with a different combination of one or more modulating frequencies used to switch the attenuating layer (not shown). Selection of one of the switch positions 985a to 985d enables a different attribute of the pen tool 920 to be selected by the user.

Figure 30:
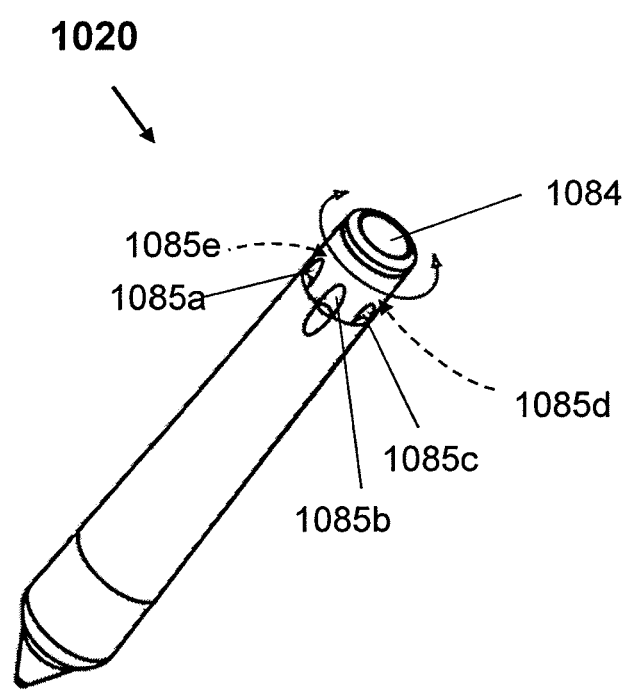
FIG. 30 is a perspective view of another embodiment of a pen tool.

FIG. 30 shows another example of a pen tool and which is generally identified by reference numeral 1020. Pen tool 1020 is generally similar to pen tool 720 described above and with reference to FIG. 26, and comprises a multi-position rotatable switch 1084 in communication with a microcontroller (not shown). Multi-position rotatable switch 1084 has a set of five (5) different indexed switch positions 1085a to 1085e, each of which is associated with a different combination of one or more modulating frequencies used to switch the attenuating layer (not shown). Selection of one of the switch positions 1085a to 1085e enables a different attribute of the pen tool 1020 to be selected by the user.

Figure 31:
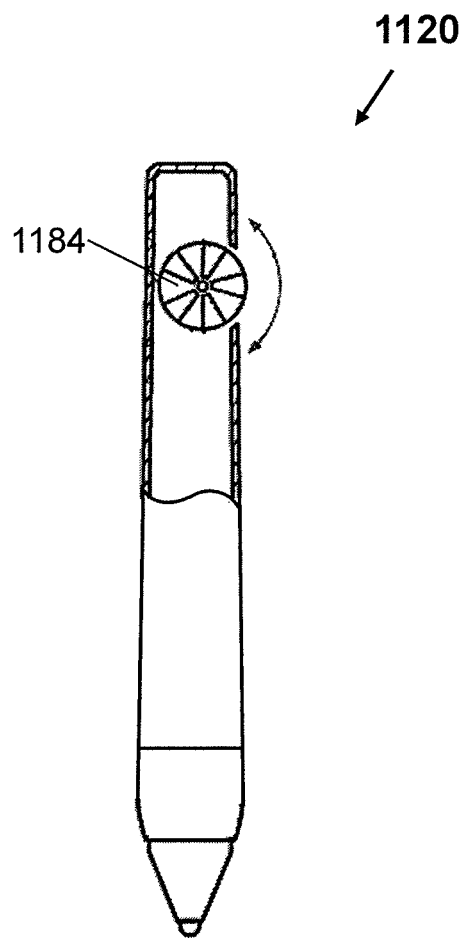
FIG. 31 is a partial cross-sectional view of another embodiment of a pen tool.

FIG. 31 shows another example of a pen tool and which is generally identified by reference numeral 1120. Pen tool 1120 is generally similar to pen tool 720 described above and with reference to FIG. 26, and comprises a multi-position dial switch 1184 in communication with a microcontroller (not shown). Multi-position dial switch 1184 has a set of five (5) different indexed switch positions (not shown), each of which is associated with a different combination of one or more modulating frequencies used to switch the attenuating layer (not shown). Selection of one of the switch positions 1185a to 1185e enables a different attribute of the pen tool 1120 to be selected by the user.

Figure 32:
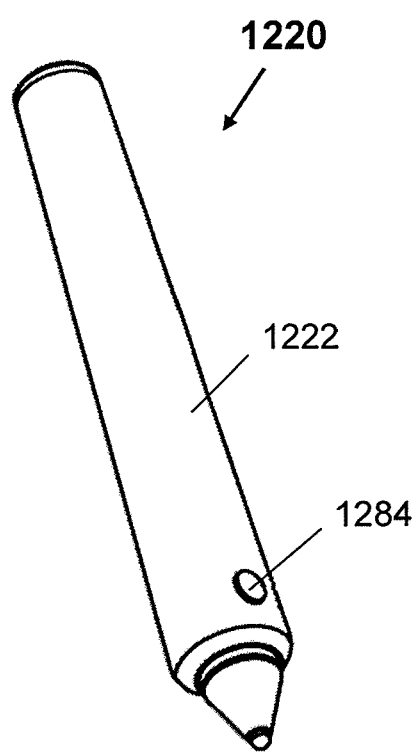
FIG. 32 is a perspective view of another embodiment of a pen tool.

FIG. 32 shows another example of a pen tool and which is generally identified by reference numeral 1220. Pen tool 1220 is generally similar to pen tool 720 described above and with reference to FIG. 20, and comprises a button 1284 disposed on the body 1222 of pen tool 1220 and which is in communication with a microcontroller (not shown). Button 1284 is configured to be pressed to enable cycling between a set of five (5) different sets of one or more modulating frequencies used to switch the attenuating layer (not shown). Each pressing of the button 1284 enables a different attribute of the pen tool 1220 to be selected by the user.

Although in embodiments described above, each pen tool modulates the reflected IR light using a different combination of the three subcarrier frequencies, where for each combination, the pen tool operates each subcarrier frequency in either an "on" state or an "off" state, in other embodiments, each combination may alternatively involve operating each subcarrier frequency in any one of a "full-power" (F) state, a "half-power" (H) state, and an "off" state (O). This permits a total of twenty-seven (or $3^n$, where n is the number of subcarrier frequencies available) different subcarrier frequency combinations each having a unique modulation pattern that can be recognized by the interactive input system. The twenty-seven (27) subcarrier frequency combinations are tabulated below in Table 2.

TABLE 2

| Combination no. | Subcarrier #1 | Subcarrier #2 | Subcarrier #3 |
|---|---|---|---|
| 1 | O | O | O |
| 2 | F | O | O |
| 3 | O | F | O |

TABLE 2-continued

| Combination no. | Subcarrier #1 | Subcarrier #2 | Subcarrier #3 |
|---|---|---|---|
| 4 | F | F | O |
| 5 | O | O | F |
| 6 | F | O | F |
| 7 | O | F | F |
| 8 | F | F | F |
| 9 | F | H | O |
| 10 | H | F | O |
| 11 | F | O | H |
| 12 | F | H | H |
| 13 | O | F | H |
| 14 | H | F | H |
| 15 | F | F | H |
| 16 | H | O | F |
| 17 | O | H | F |
| 18 | H | H | F |
| 19 | F | H | F |
| 20 | H | F | F |
| 21 | H | O | O |
| 22 | O | H | O |
| 23 | H | H | O |
| 24 | O | O | H |
| 25 | H | O | H |
| 26 | O | H | H |
| 27 | H | H | H |

Although in embodiments described above, the frame rate of the imaging assemblies is 960 Hz, the cycling rate of the IR light sources is 480 Hz, and the subcarrier frequencies are 120 Hz, 240 Hz, and 360 Hz, those of skill in the art will appreciate that the interactive input system is not limited to these frequencies. For example, the imaging assemblies may be capable of very high frame rates, such as those on the order of $10^6$ frames per second, or very low frame rates, such as 30 frames per second. Although the amount of information that may be transmitted increases as the frame rate increases, the systems and methods described above are feasible using imaging assemblies having low frame rates.

Although in embodiments described above the IR light sources are cycled at a rate that is half of the frame rate, in other embodiments, the IR light sources may alternatively be cycled at other rates, such as 1/3, 1/4 or 1/100 of the frame rate, for example.

Although in embodiments described above the difference image frame is obtained by subtracting a background image frame from an illuminated image frame, where the background image frame and the illuminated image frame are captured successively, in other embodiments, the difference image frame may be obtained using an alternative approach. For example, the difference image frame may be obtained by dividing the background image frame by the illuminated image frame, or vice versa. In still other embodiments, non-successive image frames may alternatively be used for obtaining the difference image frame.

While in embodiments described above the pointer analysis region is square, it will be appreciated that this region is not limited to this shape. Accordingly, the pointer analysis region may be other shapes, such as rectangular, circular etc. PCT/CA2010/00108

Although in embodiments described above a single pointer analysis region is associated with each located pointer, in other embodiments, multiple pointer analysis regions may be used.

Although in embodiments described above, information relating to pen tip pressure is communicated to the interactive input system by varying the amplitude of the subcarrier frequencies, in other embodiments, pen tip pressure may alternatively be communicated by being assigned to a respective subcarrier frequency.

Although in the embodiments described above, the light sources emit infrared illumination, in other embodiments, illumination of other wavelengths may alternatively be emitted.

Although preferred embodiments have been described, those of skill in the art will appreciate that variations and modifications may be made with departing from the scope thereof as defined by the appended claims.

What is claimed is:

1. A pen tool for use with a machine vision interactive input system comprising:
    an elongate body;
    a tip adjacent one end of the body;
    a variable reflector disposed on the body, the variable reflector comprising a reflecting portion and an attenuating portion, the attenuating portion being fixedly disposed on the reflecting portion and being configured to controllably scatter light to control the amount of illumination impinging on the reflecting portion;
    a switch adjacent said tip and configured to actuate when said tip is brought into contact with a surface, wherein said switch comprises an actuator protruding from the tip; and
    a controller accommodated by the body, said controller being configured: to condition electrically the attenuating portion between differing levels of transparency while said switch is actuated; and to switch the attenuating portion between two or more differing levels of transparency in response to said actuator being pushed into said tip as a result of contact between said tip and said surface.

2. The pen tool of claim 1, wherein the variable reflector is positioned adjacent the tip.

3. The pen tool of claim 1, wherein the attenuating portion comprises a liquid crystal device.

4. The pen tool of claim 3, wherein the liquid crystal device comprises a polymer dispersed liquid crystal film positioned in an annular region between coaxial electrodes.

5. The pen tool of claim 1, wherein the transparency of the attenuating portion is proportional to an applied voltage.

6. The pen tool of claim 1, wherein the variable reflector further comprises a protective outer portion.

7. The pen tool of claim 1, wherein said switch comprises an actuator protruding from the tip, the controller being configured to switch the attenuating portion between two or more differing levels of transparency in response to said actuator being pushed into said tip as a result of contact between said tip and said surface.

8. The pen tool of claim 7, further comprising a switch arrangement on said body in communication with the controller for selecting the differing levels of transparency.

9. The pen tool of claim 8 wherein said switch arrangement comprises a plurality of switch positions, each switch position being associated with a different pattern of transparency levels.

10. The pen tool of claim 1, wherein the reflecting portion comprises a retro-reflective material.

11. The pen tool of claim 10, wherein the attenuating portion covers only a portion of the retro-reflective material.

12. The pen tool of claim 1 wherein said variable reflector is a layered structure adjacent said tip comprising an inner reflective layer over which an attenuating layer is disposed.

13. The pen tool of claim 12 wherein said attenuating layer either fully or partially covers said reflective layer.

14. The pen tool of claim 13 wherein said reflective layer is formed of retro-reflecting material.

15. The pen tool of claim 1, further comprising a switch arrangement on said body in communication with the controller for selecting the differing levels of transparency.

16. The pen tool of claim 1, wherein controlling the amount of illumination impinging on the reflecting portion alters the transparency of the attenuating portion.

17. An interactive input system comprising:
at least one imaging assembly having a field of view aimed into a region of interest and configured to capture image frames;
at least one illumination source configured to emit illumination into said region of interest;
at least one pointer, the pointer comprising:
an actuatable tip comprising a reflecting portion and an attenuating portion, the attenuating portion being fixedly disposed on the reflecting portion, the attenuating portion of the tip being modulated between differing levels of transparency when the pointer is in contact with a surface within the region of interest with sufficient force to actuate the tip;
a switch adjacent said tip and configured to actuate when said tip is brought into contact with a surface in said region of interest, wherein said switch comprises an actuator protruding from the tip; and
a controller accommodated by a body of the pointer, said controller configured: to condition electrically the attenuating portion between differing levels of transparency while said switch is actuated; and to switch the attenuating portion between two or more differing levels of transparency in response to said actuator being pushed into said tip as a result of contact between said tip and said surface; and
processing structure in communication with the at least one imaging assembly, when the pointer exists in captured image frames, said processing structure configured to demodulate the captured image frames to determine frequency components thereof and examine the frequency components to determine at least one attribute of said pointer, the frequency components being representative of illumination reflected by said pointer.

18. The interactive input system of claim 17, wherein during demodulating the processing structure is configured to apply a transform to the captured image frames.

19. The interactive input system of claim 17, wherein the illumination is infrared illumination.

20. The interactive input system of claim 17, wherein the attribute comprises at least one of pointer input colour, pointer input line thickness and pointer functionality.

21. The interactive input system of claim 20, wherein the pointer functionality is one of right mouse click, left mouse click, and eraser.

22. The interactive input system of claim 17, wherein the at least one imaging assembly is configured to capture a sequence of image frames, each sequence comprising one image frame captured when the at least one illumination source is in an off state and a plurality of image frames captured when the at least one illumination source is in an on state.

23. The interactive input system of claim 22, wherein said processing structure is configured to subtract the image frame captured when the at least one illumination source is in the off state from at least one image frame captured when the at least one illumination source is in the on state to form a difference image frame, and determine a location of the pointer in the difference image frame.

24. The interactive input system of claim 23, wherein said processing structure is further configured to define an analysis region associated with the pointer location, and apply the analysis region to the captured image frames for carrying out the examining.

25. The interactive input system of claim 17, wherein each imaging assembly comprises at least two light sensors having generally identical views of the region of interest and configured to capture the image frames, the at least two light sensors having exposure periods that are generally staggered.

26. The interactive input system of claim 17, further comprising a bezel at least partially surrounding the region of interest and having a surface in the field of view of said at least one imaging assembly.

27. A method of inputting information into an interactive input system comprising:
emitting illumination into a region of interest from at least one illumination source;
modulating the reflectivity of an actuatable tip of a pointer within the region of interest between differing levels of reflectivity while the pointer is in contact with a surface within the region of interest with sufficient force to actuate the tip, the tip comprising:
a reflecting portion;
an attenuating portion, the attenuating portion being fixedly disposed on the reflecting portion;
a switch adjacent said tip and configured to actuate when said tip is brought into contact with a surface in the region of interest, wherein said switch comprises an actuator protruding from the tip; and
a controller accommodated by the body, said controller being configured: to condition electrically the attenuating portion between differing levels of transparency while said switch is actuated; and to switch the attenuating portion between two or more differing levels of transparency in response to said actuator being pushed into said tip as a result of contact between said tip and said surface;
capturing image frames of the region of interest; and
when the pointer exists in captured image frames, demodulating the captured image frames to determine frequency components thereof and examining the frequency components to determine at least one attribute of the pointer, the frequency components being representative of illumination reflected by said pointer.

28. The method of claim 27, wherein the at least one illumination source is cycled between on and off states.

29. The method of claim 28, wherein the captured image frames comprise image frames captured during the on and off states of the at least one illumination source.

30. The method of claim 29, further comprising:
generating a difference image frame by subtracting an image frame captured in the off state from an image frame captured in the on state;
determining a location of the pointer in the difference image frame; and
defining an analysis region associated with the pointer location, wherein the examining is carried out within the analysis region applied to the captured image frames.

31. The method of claim 27, wherein the attribute is selected from the group consisting of pointer input colour, pointer input line thickness and pointer functionality.

32. The method of claim 31, wherein the pointer functionality one of right mouse click, left mouse click, and eraser.

* * * * *